US012725064B2

(12) United States Patent
Hwang et al.

(10) Patent No.: US 12,725,064 B2
(45) Date of Patent: Sep. 1, 2026

(54) COMPUTING DEVICE AND OPERATING METHOD OF COMPUTING DEVICE FOR MAPPING QUANTUM CIRCUIT

(71) Applicant: Electronics and Telecommunications Research Institute, Daejeon (KR)

(72) Inventors: Yongsoo Hwang, Daejeon (KR); Byung-Soo Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 909 days.

(21) Appl. No.: 17/966,171

(22) Filed: Oct. 14, 2022

(65) Prior Publication Data

US 2023/0162077 A1 May 25, 2023

(30) Foreign Application Priority Data

Nov. 17, 2021 (KR) ........................ 10-2021-0158898
Aug. 8, 2022 (KR) ........................ 10-2022-0098343

(51) Int. Cl.
*G06N 10/20* (2022.01)

(52) U.S. Cl.
CPC .................................... *G06N 10/20* (2022.01)

(58) Field of Classification Search
CPC .......... G06N 3/08; G06N 3/045; G06N 3/048; G06N 3/0464; G06N 3/084; G06N 3/096
See application file for complete search history.

(56) References Cited

U.S. PATENT DOCUMENTS 11,966,817 B1 * 4/2024 Shutty .................... G06N 10/00
2016/0267032 A1 9/2016 Rigetti et al.
2017/0032272 A1 2/2017 Bocharov et al.
2018/0285761 A1 * 10/2018 Gambetta .............. G06N 10/40
2019/0020345 A1 1/2019 Kim et al.
2019/0220782 A1 * 7/2019 Chen ...................... G06N 10/20
2019/0378032 A1 * 12/2019 Kliuchnikov .......... G06N 10/40
2020/0125985 A1 * 4/2020 Narang .................. G06N 10/60
2020/0272926 A1 8/2020 Chaplin et al.
2021/0012045 A1 1/2021 Baek et al.
(Continued)

FOREIGN PATENT DOCUMENTS

CN 112085204 A 12/2020

OTHER PUBLICATIONS

Abdessaied et al., "Quantum Circuit Optimization by Hadamard Gate Reduction," Jul. 10, 2014, https://api.semanticscholar.org/CorpusID:2049686 https://www.semanticscholar.org/paper/Quantum-Circuit-Optimization-by-Hadamard-Gate-Abdessaied-Soeken/a69a34155c4bb4b38d6af40e81914077cde9150a https://agra.informatik.uni-bre.*

(Continued)

*Primary Examiner* — Ryan Barrett
(74) *Attorney, Agent, or Firm* — NSIP Law

(57) ABSTRACT

Disclosed is an operating method of a computing device. The operating method of a computing device includes generating quantum mapping basis information based on a fault-tolerant constraint, generating quantum circuits and initial qubit mappings by performing a quantum circuit mapping as much as the number of times based on the fault-tolerant constraint, the quantum mapping basis information, and different random initial qubit mappings, and selecting one quantum circuit and one initial qubit mapping from among the quantum circuits and the initial qubit mappings, respectively.

18 Claims, 18 Drawing Sheets

(56) References Cited

U.S. PATENT DOCUMENTS

| | | | | |
|---|---|---|---|---|
| 2021/0173660 | A1* | 6/2021 | Hogaboam | G06F 9/3851 |
| 2021/0192113 | A1 | 6/2021 | Nam et al. | |
| 2021/0391873 | A1* | 12/2021 | Zheng | G06N 3/045 |
| 2021/0399743 | A1* | 12/2021 | Zheng | G06N 10/70 |
| 2022/0164505 | A1* | 5/2022 | Mosca | G06F 30/327 |
| 2022/0253742 | A1* | 8/2022 | Zheng | G06N 10/70 |
| 2024/0028939 | A1* | 1/2024 | Akhalwaya | G06N 10/40 |
| 2025/0094850 | A1* | 3/2025 | Kim | G06N 10/40 |
| 2025/0094851 | A1* | 3/2025 | Kang | G06N 10/70 |
| 2025/0181952 | A1* | 6/2025 | Bravyi | G06N 10/40 |
| 2025/0265488 | A1* | 8/2025 | Zhang | G06N 10/00 |

OTHER PUBLICATIONS

Korean Office Action Issued on Jun. 11, 2025, in Counterpart Korean Patent Application No. 10-2022-0098343 (6 Pages in English, 6 Pages in Korean).

Svore, Krysta M., et al. "Noise threshold for a fault-tolerant two-dimensional lattice architecture." *arXiv preprint quant-ph/0604090* (2006). pp 1-22.

Li, Gushu, et al. "Tackling the qubit mapping problem for NISQ-era quantum devices." *Proceedings of the Twenty-Fourth International Conference on Architectural Support for Programming Languages and Operating Systems*. (2019). pp. 1001-1014.

Korean Office Action Issued on Apr. 4, 2025, in Counterpart Korean Patent Application No. 10-2022-0098343 (5 Pages in English, 5 Pages in Korean).

* cited by examiner

FIG. 3A

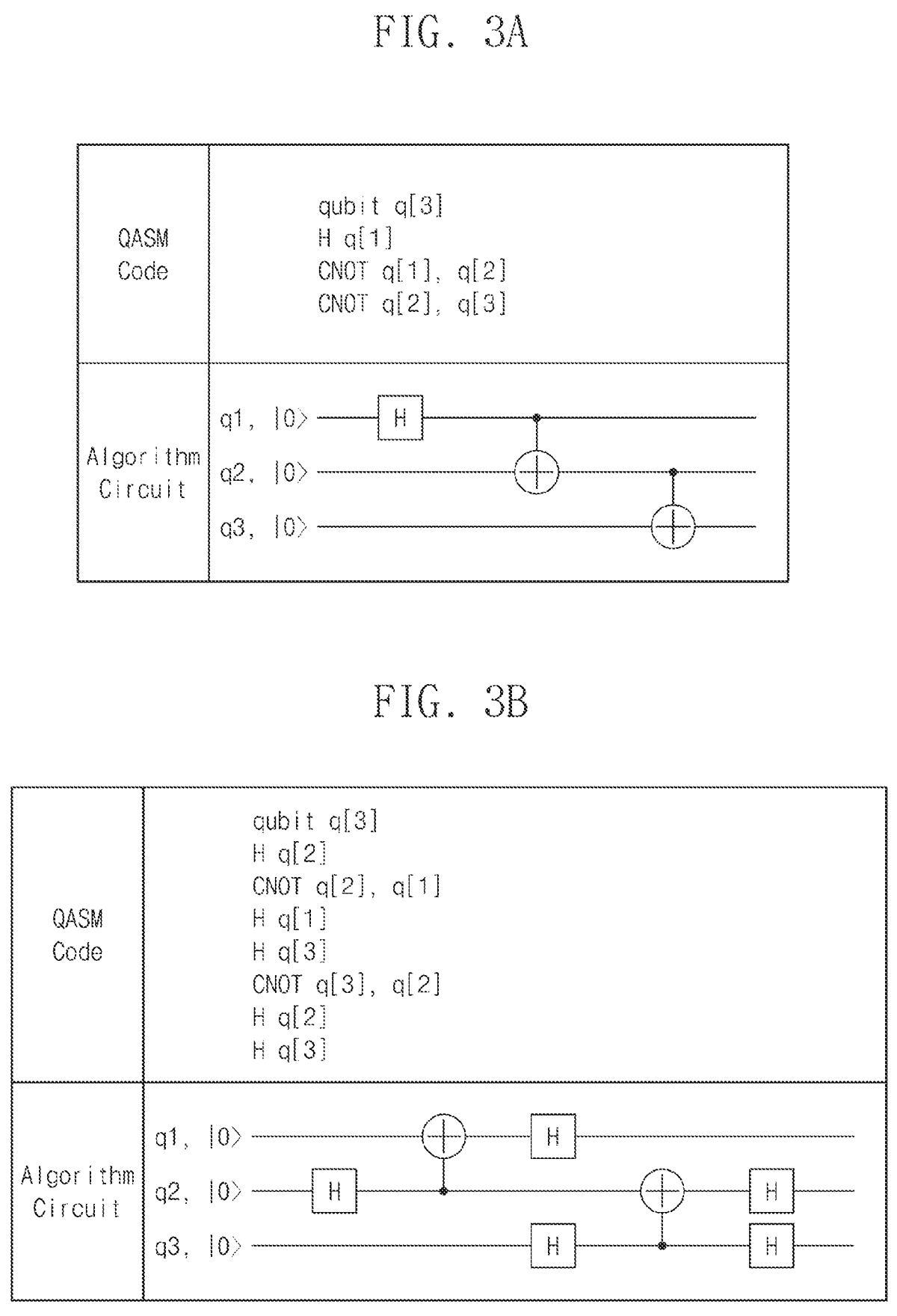

| | |
|---|---|
| QASM Code | qubit q[3]<br>H q[1]<br>CNOT q[1], q[2]<br>CNOT q[2], q[3] |
| Algorithm Circuit | q1, \|0〉<br>q2, \|0〉<br>q3, \|0〉<br>H |

FIG. 3B

| | |
|---|---|
| QASM Code | qubit q[3]<br>H q[2]<br>CNOT q[2], q[1]<br>H q[1]<br>H q[3]<br>CNOT q[3], q[2]<br>H q[2]<br>H q[3] |
| Algorithm Circuit | q1, \|0〉<br>q2, \|0〉<br>q3, \|0〉<br>H H H H H |

Figure 8:
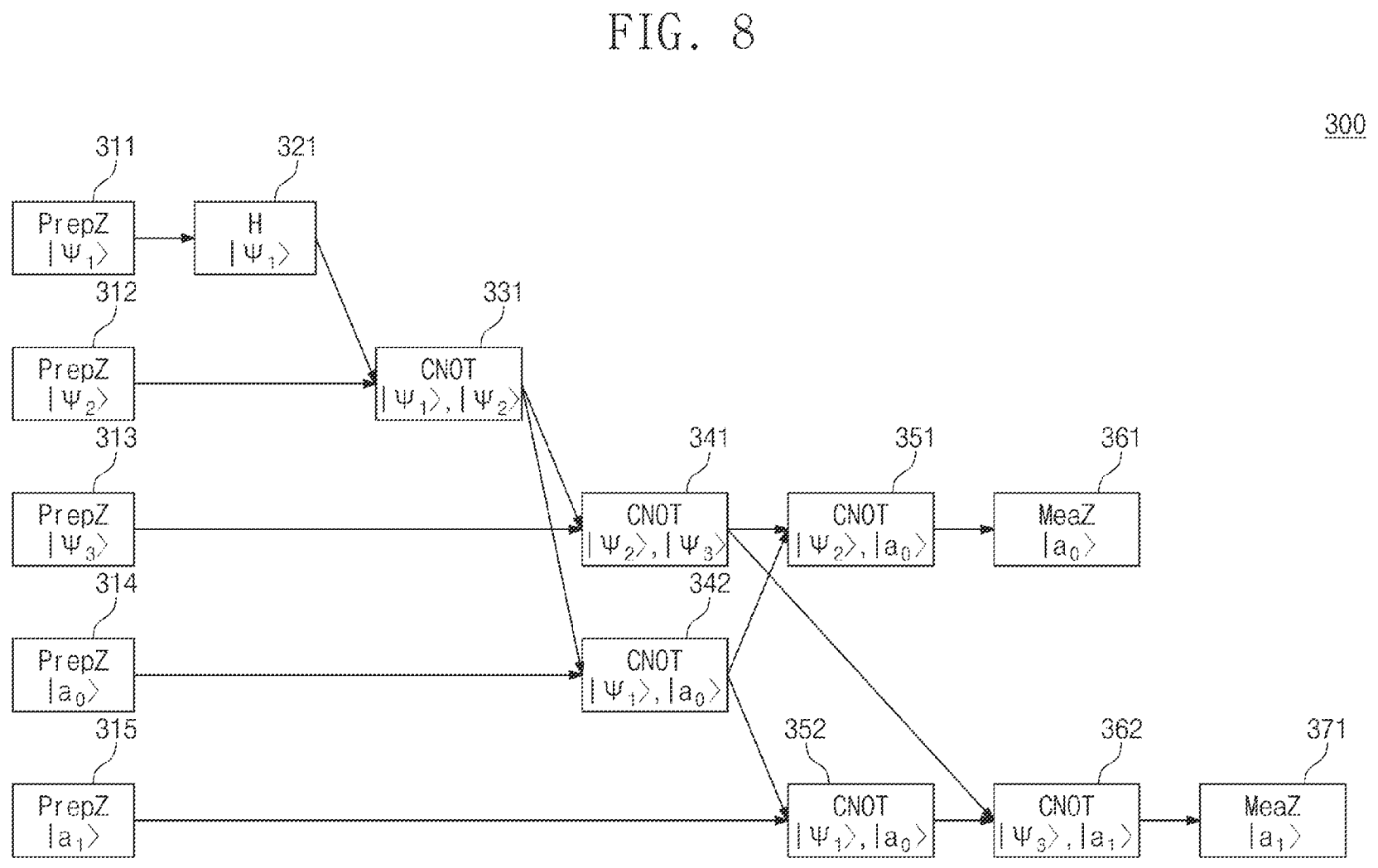

311 PrepZ $|\psi_1\rangle$

312 PrepZ $|\psi_2\rangle$

313 PrepZ $|\psi_3\rangle$

314 PrepZ $|a_0\rangle$

315 PrepZ $|a_1\rangle$

321 H $|\psi_1\rangle$

331 CNOT $|\psi_1\rangle, |\psi_2\rangle$

341 CNOT $|\psi_2\rangle, |\psi_3\rangle$

342 CNOT $|\psi_1\rangle, |a_0\rangle$

351 CNOT $|\psi_2\rangle, |a_0\rangle$

352 CNOT $|\psi_1\rangle, |a_0\rangle$

361 MeaZ $|a_0\rangle$

362 CNOT $|\psi_3\rangle, |a_1\rangle$

371 MeaZ $|a_1\rangle$

Figure 9:
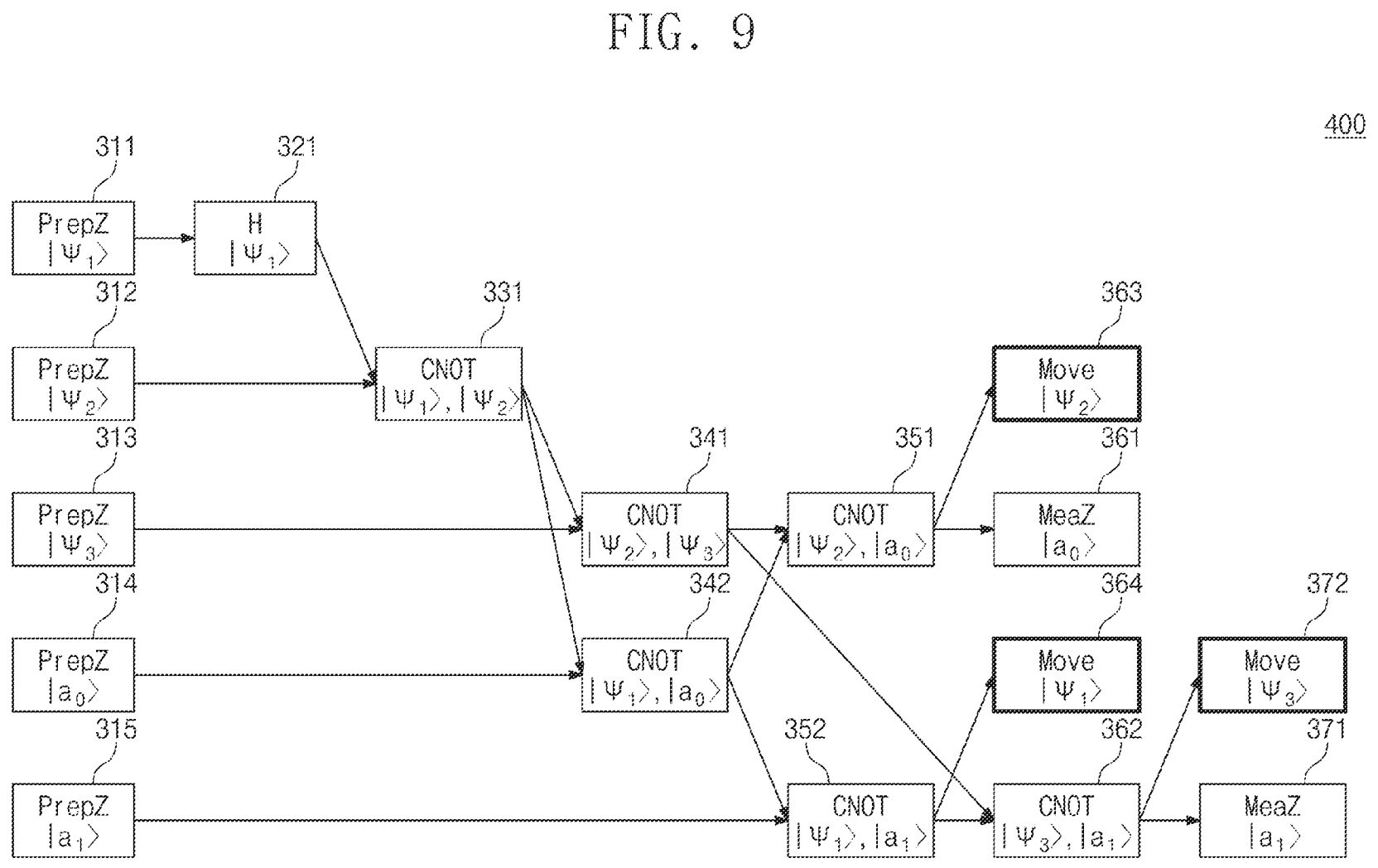

311 PrepZ $|\psi_1\rangle$
312 PrepZ $|\psi_2\rangle$
313 PrepZ $|\psi_3\rangle$
314 PrepZ $|a_0\rangle$
315 PrepZ $|a_1\rangle$
321 H $|\psi_1\rangle$
331 CNOT $|\psi_1\rangle, |\psi_2\rangle$
341 CNOT $|\psi_2\rangle, |\psi_3\rangle$
342 CNOT $|\psi_1\rangle, |a_0\rangle$
351 CNOT $|\psi_2\rangle, |a_0\rangle$
352 CNOT $|\psi_1\rangle, |a_1\rangle$
363 Move $|\psi_2\rangle$
361 MeaZ $|a_0\rangle$
364 Move $|\psi_1\rangle$
362 CNOT $|\psi_3\rangle, |a_1\rangle$
372 Move $|\psi_3\rangle$
371 MeaZ $|a_1\rangle$

COMPUTING DEVICE AND OPERATING METHOD OF COMPUTING DEVICE FOR MAPPING QUANTUM CIRCUIT

CROSS-REFERENCE TO RELATED APPLICATIONS

This application claims priority under 35 U.S.C. § 119 to Korean Patent Application No. 10-2021-0158898 filed on Nov. 17, 2021, and Korean Patent Application No. 10-2022-0098343 filed on Aug. 8, 2022, in the Korean Intellectual Property Office, the disclosures of which are incorporated by reference herein in their entireties.

BACKGROUND

Embodiments of the present disclosure described herein relate to an electronic device, and more particularly, relate to a computing device mapping a quantum circuit, and an operating method of the computing device.

Physical characteristics of a quantum computer are different from those of a general classical computer. Accordingly, a quantum algorithm that is logically organized to operate in a quantum computer needs be converted into a quantum circuit based on physical characteristics of the quantum computer. A process of converting the quantum algorithm into the quantum circuit is referred to as a "quantum circuit mapping".

The physical characteristics of a quantum computer may be different depending on characteristics of the quantum computer hardware platform. For example, the quantum computer implemented based on a semiconductor (a superconductor, a quantum dot, or the like) has strong spatial locality constraints. The semiconductor-based quantum computer may perform an operation of a 2-qubit quantum gate (e.g., a Controlled-NOT (CNOT) gate, a Controlled-Z (CZ) gate, or the like) between only qubits that are physically and spatially adjacent to one another.

SUMMARY

Embodiments of the present disclosure provide a computing device that automatically maps a fault-tolerant quantum circuit and an operating method of the computing device.

According to an embodiment, an operating method of a computing device includes generating quantum mapping basis information based on a fault-tolerant constraint, generating quantum circuits and initial qubit mappings by performing a quantum circuit mapping as much as the number of times based on the fault-tolerant constraint, the quantum mapping basis information, and different random initial qubit mappings, and selecting one quantum circuit and one initial qubit mapping from among the quantum circuits and the initial qubit mappings, respectively.

In an embodiment, the generating of the quantum mapping basis information based on the fault-tolerant constraint includes obtaining a coupling graph of physical qubits of a quantum chip, generating a distance matrix from the coupling graph of the physical qubits, obtaining a quantum assembly (QASM) code, generating a circuit directed acyclic graph (DAG) based on the QASM and the fault-tolerant constraint, and detecting a front layer of the circuit DAG.

In an embodiment, the generating of the circuit DAG based on the QASM and the fault-tolerant constraint includes generating an intermediate circuit DAG based on the QASM and generating the circuit DAG by adding a quantum operations, which move input data qubits to initial locations, to the intermediate circuit DAG.

In an embodiment, the quantum mapping basis information includes the distance matrix, the circuit DAG, and information of the front layer.

In an embodiment, the performing of the quantum circuit mapping includes performing a first forward traverse based on the fault-tolerant constraint, the quantum mapping basis information, and one random initial qubit mapping among the random initial qubit mappings, performing a backward traverse based on the fault-tolerant constraint, the quantum mapping basis information, and a result qubit mapping of the first forward traverse, performing a second forward traverse based on the fault-tolerant constraint, the quantum mapping basis information, and a result qubit mapping of the backward traverse, and outputting a quantum circuit mapped in the second forward traverse and the result qubit mapping of the backward traverse as a quantum circuit and an initial qubit mapping, which correspond to the one random initial qubit mapping.

In an embodiment, the fault-tolerant constraint includes restricting an interaction between data qubits, which are in active states within one logical qubit, during the first forward traverse, the backward traverse, and the second forward traverse.

In an embodiment, each of the first forward traverse and the second forward traverse change a use state of a data qubit into an active state in response to a preparation of the data qubit and changes the use state of the data qubit into an inactive state in response to a measurement of the data qubit.

In an embodiment, the backward traverse changes a use state of a data qubit into an active state in response to a measurement of the data qubit and changes the use state of the data qubit into an inactive state in response to a preparation of the data qubit.

In an embodiment, the method further includes generating second quantum mapping basis information based on the fault-tolerant constraint, and generating a second quantum circuit by performing the quantum circuit mapping based on the fault-tolerant constraint, the second quantum mapping basis information, and the one initial qubit mapping.

According to an embodiment, a computing device includes a constraint storage unit that stores a fault-tolerant constraint, and a circuit mapping unit that generates a quantum circuit and an initial qubit mapping by performing a quantum circuit mapping based on information of a quantum chip including physical qubits, quantum algorithm information, and the fault-tolerant constraint. The circuit mapping unit is configured to perform the quantum circuit mapping based on different random initial qubit mappings as much as the number of times, and to select the quantum circuit and the initial qubit mapping among quantum circuits and initial qubit mappings, which correspond to the different random initial qubit mappings.

In an embodiment, the circuit mapping unit generates a distance matrix of the physical qubits from the information of the quantum chip, generates a circuit DAG based on the fault-tolerant constraint from the quantum algorithm information, and detects a front layer from the circuit DAG.

In an embodiment, the circuit mapping unit generates an intermediate circuit DAG from the quantum algorithm information, and generates the circuit DAG by adding quantum operations, which move input data qubits to initial locations, to the intermediate circuit DAG.

In an embodiment, the circuit mapping unit performs the quantum circuit mapping as much as the number of times based on the distance matrix, the circuit DAG, information of the front layer, the fault-tolerant constraint, and the different random initial qubit mappings.

In an embodiment, the circuit mapping unit performs a first forward traverse based on the information of the quantum chip, the quantum algorithm information, the fault-tolerant constraint, and one random initial qubit mapping among the random initial qubit mappings, performs a backward traverse based on the information of the quantum chip, the quantum algorithm information, the fault-tolerant constraint, and a result qubit mapping of the first forward traverse, and performs the quantum circuit mapping by performing a second forward traverse based on the information of the quantum chip, the quantum algorithm information, the fault-tolerant constraint, and a result qubit mapping of the backward traverse. The circuit mapping unit outputs a quantum circuit mapped in the second forward traverse and the result qubit mapping of the backward traverse, as the quantum circuit and the initial qubit mapping.

In an embodiment, the fault-tolerant constraint includes restricting an interaction between data qubits, which are in active states within one logical qubit, during the first forward traverse, the backward traverse, and the second forward traverse.

In an embodiment, in each of the first forward traverse and the second forward traverse, the circuit mapping unit changes a use state of a data qubit into an active state in response to a preparation of the data qubit and changes the use state of the data qubit into an inactive state in response to a measurement of the data qubit.

In an embodiment, in the backward traverse, the circuit mapping unit changes a use state of a data qubit into an active state in response to a measurement of the data qubit and changes the use state of the data qubit into an inactive state in response to a preparation of the data qubit.

In an embodiment, the circuit mapping unit is further configured to generate a second quantum circuit by performing the quantum circuit mapping based on the information of the quantum chip, second quantum algorithm information, the fault-tolerant constraint, and the initial qubit mapping.

BRIEF DESCRIPTION OF THE FIGURES

The above and other objects and features of the present disclosure will become apparent by describing in detail embodiments thereof with reference to the accompanying drawings.

FIG. 3A shows an example of a quantum algorithm implemented as a QASM code and an algorithm circuit.

FIG. 3B shows a QASM code and an algorithm circuit of a mapped quantum algorithm.

FIG. 8 shows an example of an intermediate circuit DAG generated from the algorithm circuit of FIG. 7.

FIG. 9 shows an example of a circuit DAG generated from the intermediate circuit DAG of FIG. 8.

DETAILED DESCRIPTION

Below, embodiments of the present disclosure may be described in detail and clearly to such an extent that an ordinary one in the art easily implements the present disclosure.

Figure 1:
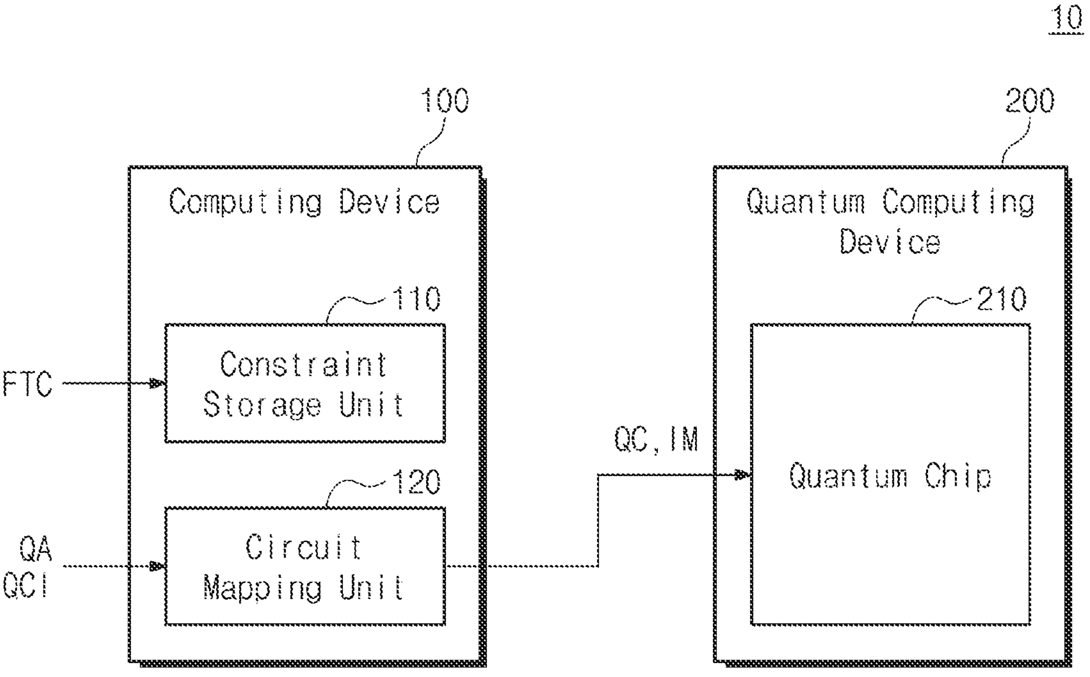
FIG. 1 shows a quantum system, according to an embodiment of the present disclosure.

FIG. 1 shows a quantum system 10, according to an embodiment of the present disclosure. Referring to FIG. 1, the quantum system 10 may include a computing device 100 and a quantum computing device 200.

The computing device 100 may generate a quantum circuit QC and an initial qubit mapping IM by performing a quantum circuit mapping based on a fault-tolerant constraint FTC, quantum algorithm information QA (or quantum protocol information), and quantum chip information QCI. The computing device 100 may include a constraint storage unit 110 and a circuit mapping unit 120.

The constraint storage unit 110 is configured to store the fault-tolerant constraint FTC. For example, the fault-tolerant constraint FTC may be delivered to the constraint storage unit 110 of the computing device 100 by a user or an external computing device. The fault-tolerant constraint FTC may allow the circuit mapping unit 120 to map a fault-tolerant quantum circuit.

The circuit mapping unit 120 may generate the quantum circuit QC and the initial qubit mapping IM based on the fault-tolerant constraint FTC, the quantum algorithm information QA, and the quantum chip information QCI.

The quantum computing device 200 may perform quantum computing. The quantum computing device 200 may be implemented based on a semiconductor such as a superconductor, a quantum dot, or the like. The quantum computing device 200 may include a quantum chip 210 including a plurality of qubits.

A quantum error correction operation may be used to correct an error occurring during a quantum operation. For example, encoding may be performed on a [[n, k, d]] quantum error correction code by distributing 'k' pieces of logical quantum information to 'n' physical qubits (each of 'n', 'k', and 'd' is a positive integer). The quantum information encoded by using the [[n, k, d]] quantum error correction code may support correcting quantum errors that occur in physical qubits, of which the number is not greater than "(d−1)/2", within a logical qubit.

The quantum errors may be spread (or propagated) by operations of two or more qubits. A fault-tolerant quantum algorithm (or a fault-tolerant quantum protocol) may guarantee a normal operation even when some quantum errors occur by suppressing quantum errors such that the number of quantum errors is not greater than "(d−1)/2".

Figure 2:
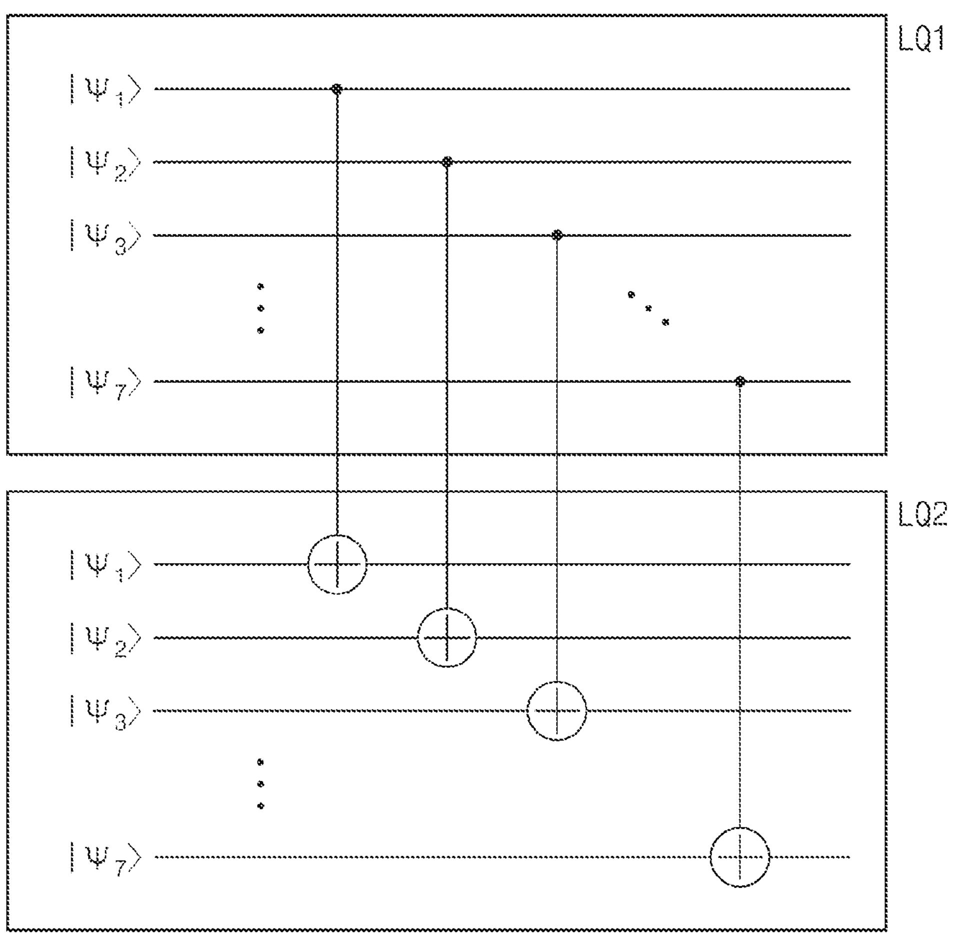
FIG. 2 shows an example of a quantum algorithm implemented in a form of a circuit.

FIG. 2 shows an example of a quantum algorithm (or a quantum protocol) implemented in a form of a circuit. Referring to FIG. 2, a quantum algorithm (or a quantum protocol) may include a quantum operation between a first logical qubit LQ1 and a second logical qubit LQ2. Each of the first logical qubit LQ1 and the second logical qubit LQ2 may include first to seventh physical qubits $|\psi_1\rangle$ to $|\psi_7\rangle$. The quantum algorithm (or the quantum protocol) of FIG. 2 may perform a CNOT operation $\oplus$ on the first to seventh physical qubits $|\psi_1\rangle$ to $|\psi_7\rangle$ of the first logical qubit LQ1 and the first to seventh physical qubits $|\psi_1\rangle$ to $|\psi_7\rangle$ of the second logical qubit LQ2, respectively. For example, the quantum algorithm (or the quantum protocol) of FIG. 2 may be a transversal CNOT operation.

The quantum algorithm (or the quantum protocol) of FIG. 2 does not perform a multi-qubit quantum operation between the first to seventh physical qubits $|\psi_1\rangle$ to $|\psi_7\rangle$ of the first logical qubit LQ1. Moreover, the quantum algorithm (or the quantum protocol) of FIG. 2 does not perform a multi-qubit quantum operation between the first to seventh physical qubits $|\psi_1\rangle$ to $|\psi_7\rangle$ of the second logical qubit LQ2. In other words, because the quantum algorithm (or the quantum protocol) of FIG. 2 does not propagate a quantum error within the first logical qubit LQ1, it may be fault-tolerant. Moreover, because the quantum algorithm (or quantum protocol) of FIG. 2 does not propagate a quantum error within the second logical qubit LQ2, it may be fault-tolerant.

At least, when a Hadamard gate as a unitary gate, a T gate and a CNOT gate, a preparation (e.g., Z-axis preparation) gate and measurement (e.g., Z-axis measurement) gate as an initialization and measurement gate, and a syndrome measurement gate as an error correction gate are implemented fault-tolerantly (e.g., when implemented transversally), a general-purpose fault-tolerant quantum operation may be performed.

FIG. 3A shows an example of a quantum algorithm (or a quantum protocol) implemented as a quantum assembly (QASM) code and an algorithm circuit. Referring to FIG. 3A, according to "qubit q[3]" of the QASM code, each of first to third qubits q1 to q3 may be prepared as '|0>'. According to "H q[1]" of the QASM code, an operation of a Hadamard gate 'H' may be performed in the first qubit q1.

According to "CNOT q[1], q[2]" of the QASM code, an operation of the CNOT gate $\oplus$ may be performed with reference to the first qubit q1 in the second qubit q2. According to "CNOT q[2], q[3]" of the QASM code, the operation of the CNOT gate $\oplus$ may be performed with reference to the second qubit q2 in the third qubit q3.

When performing a quantum operation by using the quantum chip 210, the quantum computing device 200 has a locality constraint. The quantum computing device 200 may perform a quantum operation only between qubits of the quantum chip 210 adjacent to each other.

A coupling structure of qubits of the quantum chip 210 may vary depending on the type of the quantum chip 210. Accordingly, a process of mapping a quantum circuit from the quantum algorithm (or the quantum protocol) of FIG. 3A may refer to the quantum chip information QCI of the quantum chip 210 (see FIG. 1) (e.g., a physical connectivity state of qubits of the quantum chip 210). For example, when there is a need for a 2-qubit operation between qubits that are not adjacent to each other, a SWAP gate that moves qubits, which are targets of a quantum operation, so as to be adjacent to each other may be added during the process of mapping a quantum circuit.

Some operations of the quantum algorithm (or the quantum protocol) of FIG. 3A may be impossible in a specific quantum chip (e.g., ibmqx4). FIG. 3B illustrates an example in which the quantum algorithm (or the quantum protocol) of FIG. 3A is modified such that all operations of the quantum algorithm are possible in a specific quantum chip (e.g., ibmqx4).

FIG. 3B shows a QASM code and an algorithm circuit of a modified quantum algorithm (or a modified quantum protocol). Referring to FIG. 3B, according to "qubit q[3]" of the QASM code, each of first to third qubits q1 to q3 may be prepared as '|0>'. According to "H q[2]" of the QASM code, an operation of the Hadamard gate 'H' may be performed in the second qubit q2.

According to "CNOT q[2], q[1]" of the QASM code, the operation of the CNOT gate $\oplus$ may be performed with reference to the second qubit q2 in the first qubit q1. According to "H q[1]" of the QASM code, the operation of a Hadamard gate 'H' may be performed in the first qubit q1. According to "H q[3]" of the QASM code, the operation of the Hadamard gate 'H' may be performed in the third qubit q3.

According to "CNOT q[3], q[2]" of the QASM code, an operation of the CNOT gate $\oplus$ may be performed with reference to the third qubit q3 in the second qubit q2. According to "H q[2]" of the QASM code, an operation of the Hadamard gate 'H' may be performed in the second qubit q2. According to "H q[3]" of the QASM code, the operation of the Hadamard gate 'H' may be performed in the third qubit q3.

As described above, when a quantum circuit mapping is performed based on a quantum algorithm (or quantum protocol), a modification may occur due to a locality constraint and an inter-connection relationship between qubits of the quantum chip 210. The modification may include a SWAP gate operation of the first to seventh physical qubits $|\psi_1\rangle$ to $|\psi_7\rangle$ in the first logical qubit LQ1 or the second logical qubit LQ2 of a transversal CNOT gate operation of FIG. 2.

The SWAP gate operation of the first to seventh physical qubits $|\psi_1\rangle$ to $|\psi_7\rangle$ in the first logical qubit LQ1 or the second logical qubit LQ2 may include a SWAP gate operation between the first to seventh physical qubits $|\psi_1\rangle$ to $|\psi_7\rangle$ in the first logical qubit LQ1 or a SWAP gate operation between the first to seventh physical qubits $|\psi_1\rangle >$ to $|\psi_7\rangle$ in the second logical qubit LQ2. When the modification occurs, a modified quantum algorithm (or a modified quantum protocol) causes the propagation of a quantum error within the first logical qubit LQ1 or within the second logical qubit LQ2. That is, a quantum algorithm (or a quantum protocol) designed to be fault-tolerant may be changed by the modification of a quantum circuit mapping process such that the quantum algorithm is not fault-tolerant any more.

According to an embodiment of the present disclosure, a fault-tolerant characteristic of a fault-tolerant quantum algorithm (or a fault-tolerant quantum protocol) is prevented from being lost in the quantum circuit mapping process, by reflecting a fault-tolerant constraint in the quantum circuit mapping process. Accordingly, the computing device 100 (see FIG. 1) may automatically generate the quantum circuit QC by performing a quantum circuit mapping while maintaining the fault-tolerant characteristic.

According to an embodiment of the present disclosure, the computing device 100 may perform the quantum circuit mapping based on a heuristic-based quantum circuit mapping algorithm. The heuristic-based quantum circuit mapping algorithm may perform a process of searching for a qubit movement path, which is locally optimized, based on an arbitrary initial qubit mapping (or arrangement). According to an embodiment of the present disclosure, on the basis of the heuristic-based quantum circuit mapping algorithm, the computing device 100 may update an arbitrary initial qubit mapping and may repeat the process of searching for the qubit movement path, which is locally optimized. Accordingly, the computing device 100 may generate a plurality of quantum circuits (mapped quantum circuits) corresponding to a plurality of initial qubit mappings different from one another. According to an embodiment of the present disclosure, the computing device 100 may select a quantum circuit, which has the highest performance, from among a plurality of quantum circuits as the final quantum circuit, and may select an initial qubit mapping, which has the lowest cost, from among a plurality of initial qubit mappings as the final initial qubit mapping. For example, the heuristic-based quantum circuit mapping algorithm may include SABRE.

The SABRE is described in "Tackling the Qubit Mapping Problem for NISQ-Era Quantum Devices" published on Apr. 13, 2019 by 'Li, G., Ding, Y., and Xie, Y.', and is included as a reference.

Figure 4:
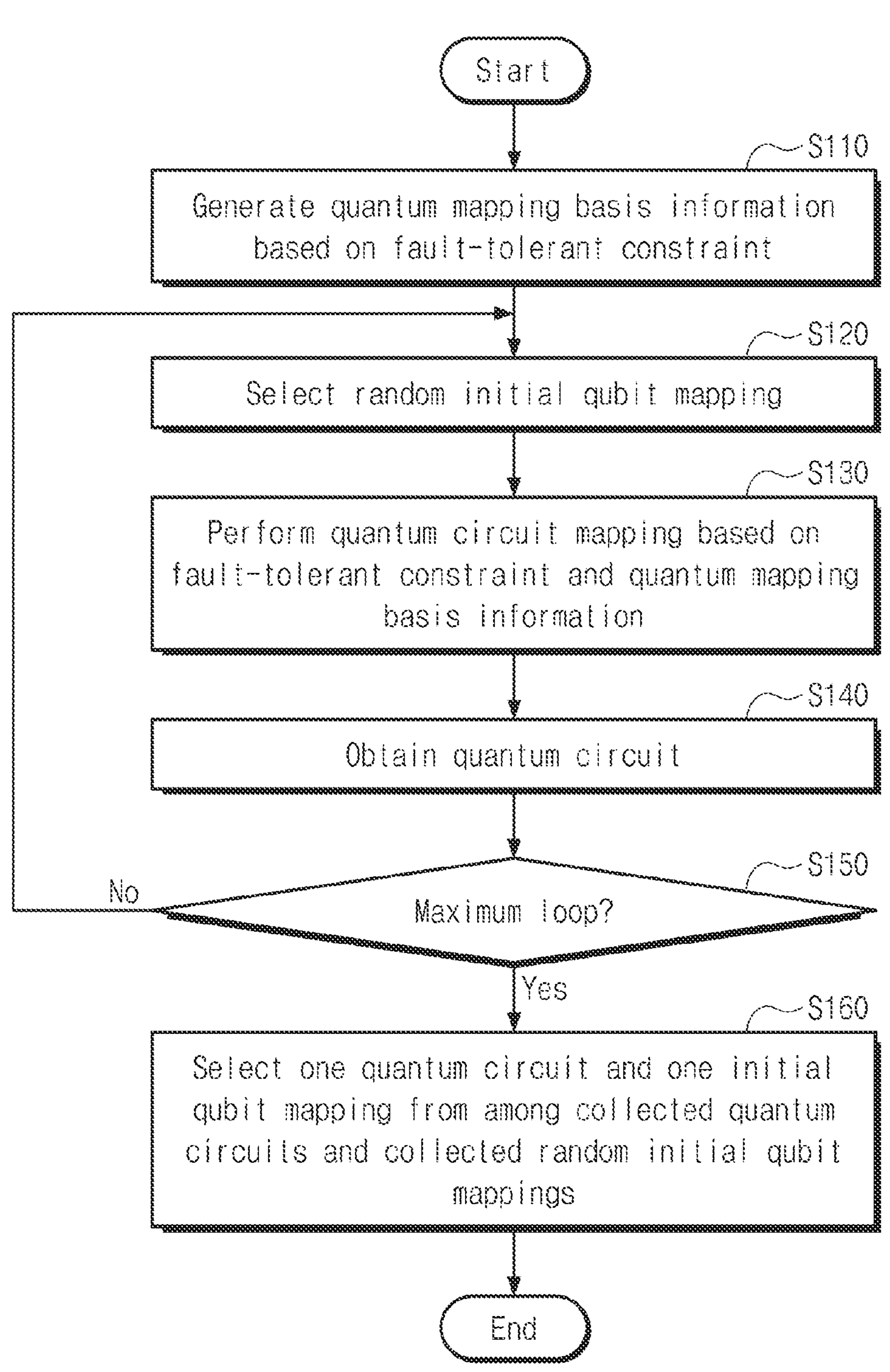
FIG. 4 shows an operating method of a computing device, according to an embodiment of the present disclosure.

FIG. 4 shows an operating method of the computing device 100, according to an embodiment of the present disclosure. Referring to FIGS. 1 and 4, in operation S110, the circuit mapping unit 120 of the computing device 100 may generate quantum mapping basis information based on the fault-tolerant constraint FTC. For example, the circuit mapping unit 120 of the computing device 100 may generate quantum mapping basis information based on the fault-tolerant constraint FTC, the quantum chip information QCI, and the quantum algorithm information QA (or quantum protocol information).

In operation S120, the circuit mapping unit 120 of the computing device 100 may select a random initial qubit mapping. The random qubit mapping may include mapping information for placing input physical qubits (e.g., input data qubits) of input logical qubit(s) of a quantum algorithm (or a quantum protocol) into physical qubits (e.g., qubit nodes) within the quantum chip 210.

In operation S130, the circuit mapping unit 120 of the computing device 100 may perform a quantum circuit mapping based on the fault-tolerant constraint FTC and the quantum mapping basis information. In operation S140, the circuit mapping unit 120 of the computing device 100 may obtain (or generate) a quantum circuit corresponding to a random initial qubit mapping, by performing the quantum circuit mapping.

In operation S150, the circuit mapping unit 120 of the computing device 100 may determine whether the quantum circuit mapping has been performed as much as the maximum number of iterations. When the quantum circuit mapping has not been performed as much as the maximum number of iterations (i.e., when the quantum circuit mapping has been performed to be less than the maximum number of iterations), in operation S120, the circuit mapping unit 120 of the computing device 100 may update (or change) the random initial qubit mapping. Afterward, the circuit mapping unit 120 of the computing device 100 may generate a quantum circuit corresponding to a modified random initial qubit mapping by performing the quantum circuit mapping in operation S130 and operation S140.

In operation S150, when the quantum circuit mapping has been performed as much as the maximum number of iterations, the circuit mapping unit 120 of the computing device 100 may have initial random qubit mappings and quantum circuits. Each of the number of random initial qubit mappings and the number of quantum circuits corresponds to the maximum number of iterations. In operation S160, the circuit mapping unit 120 of the computing device 100 may select one quantum circuit and one initial qubit mapping from among collected quantum circuits and collected random initial qubit mappings as the quantum circuit QC and the initial qubit mapping IM.

Figure 5:
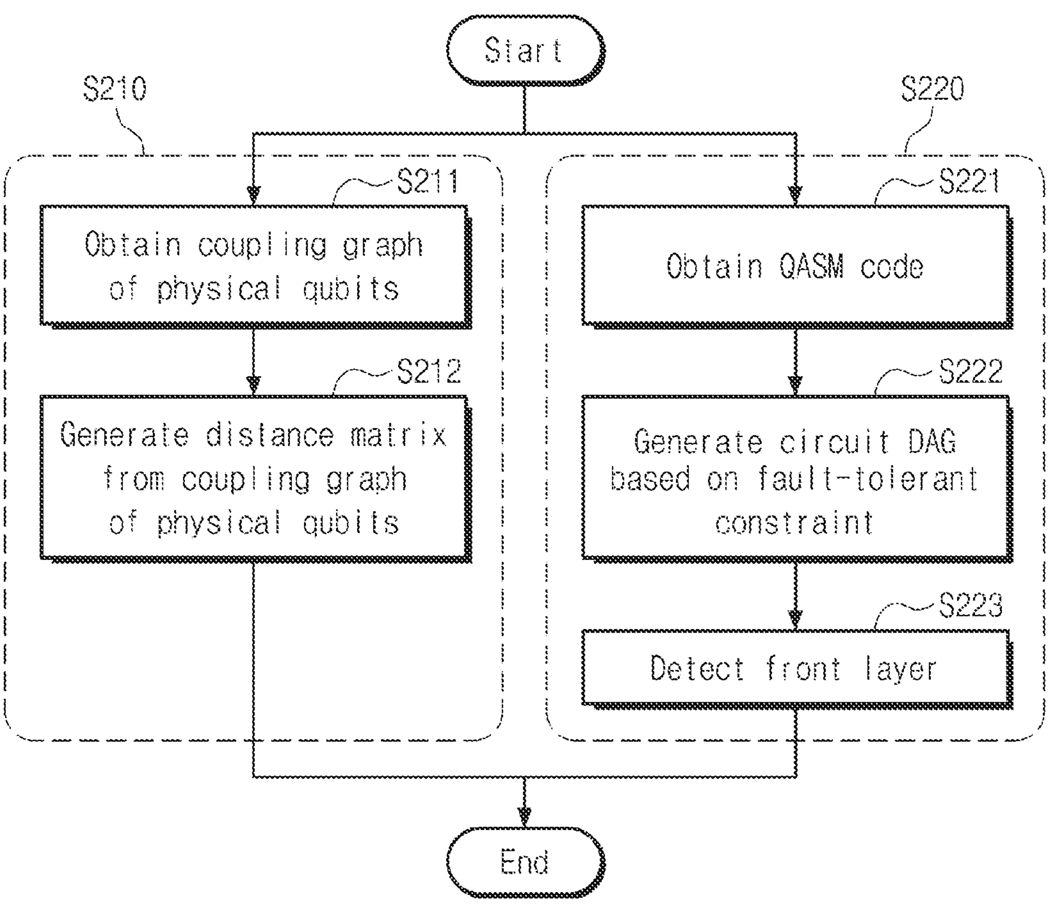
FIG. 5 illustrates that a computing device generates quantum mapping basis information, according to an embodiment of the present disclosure.

FIG. 5 illustrates that the computing device 100 generates quantum mapping basis information (in operation S110 of FIG. 4), according to an embodiment of the present disclosure. Referring to FIGS. 1 and 5, in operation S210, the circuit mapping unit 120 of the computing device 100 may generate a part of quantum circuit mapping basis information from the quantum chip information QCI.

Operation S210 may include operation S211 and operation S212. In operation S211, the circuit mapping unit 120 of the computing device 100 may obtain (or generate) a coupling graph of physical qubits (or qubit nodes) of the quantum chip 210 from the quantum chip information QCI. In operation S212, the circuit mapping unit 120 of the computing device 100 may generate a distance matrix of physical qubits (or qubit nodes) of the quantum chip 210 from the coupling graph of the physical qubits (or qubit nodes) of the quantum chip 210. The distance matrix may be included in the quantum circuit mapping basis information.

In operation S220, the circuit mapping unit 120 of the computing device 100 may generate a part of the quantum circuit mapping basis information from the quantum algorithm information QA. Operation S220 may include operation S221, operation S222, and operation S223.

In operation S221, the circuit mapping unit 120 of the computing device 100 may obtain (e.g., receive) a QASM code as the quantum algorithm information QA. In operation S222, the circuit mapping unit 120 of the computing device 100 may generate a circuit directed acyclic graph (DAG) based on the fault-tolerant constraint FTC. The circuit DAG may be generated by converting the QASM code into a form of DAG. In operation S223, the circuit mapping unit 120 of the computing device 100 may detect a front layer of the circuit DAG. The circuit DAG and the front layer information may be included in the quantum mapping basis information.

Figure 6:
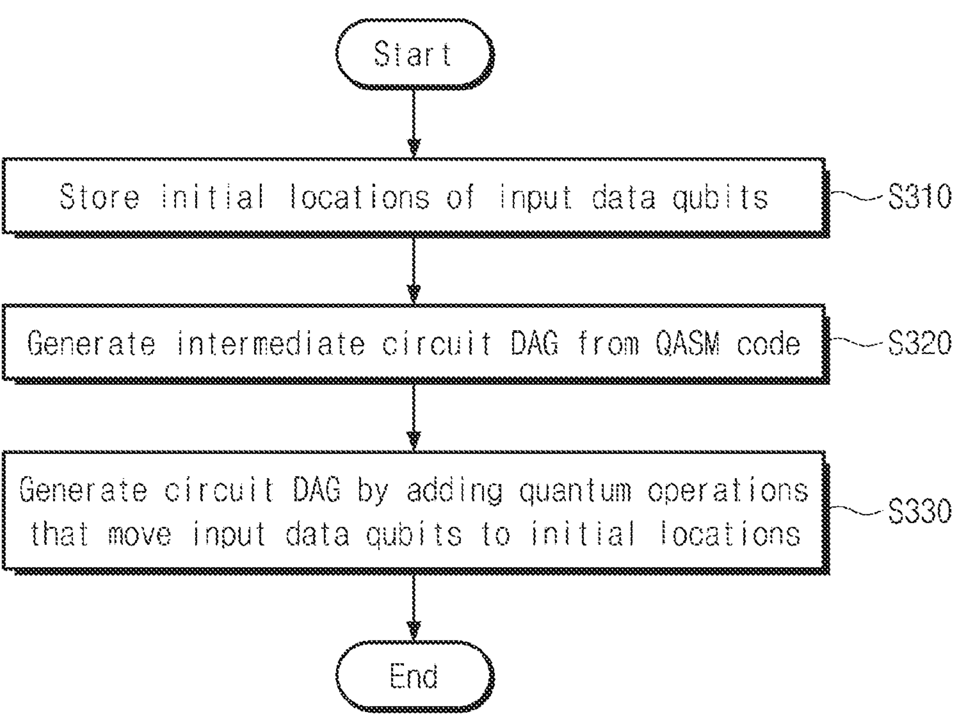
FIG. 6 shows that a computing device generates a circuit DAG based on a fault-tolerant constraint.

FIG. 6 shows that the computing device 100 generates a circuit DAG based on a fault-tolerant constraint (in operation S222 of FIG. 5). Referring to FIGS. 1 and 6, in operation S310, the circuit mapping unit 120 of the computing device 100 may store initial locations of input data qubits. In operation S320, the circuit mapping unit 120 of the computing device 100 may generate an intermediate circuit DAG from the QASM code of a quantum algorithm (or a quantum protocol).

In operation S330, the circuit mapping unit 120 of the computing device 100 may generate a circuit DAG by adding quantum operations, which move the input data qubits to the initial locations, to the intermediate circuit DAG.

When the initial locations of the input data qubits are changed in a quantum circuit, the result of a quantum operation may vary. When the input data qubits are moved to the initial locations (e.g., physical qubit locations or qubit node locations of the quantum chip 210) after the quantum operation is performed, a self-contained fault-tolerant quantum circuit in which the result of the quantum operation does not vary may be mapped no matter what type of a quantum operation is performed (or even when being performed additionally in the next operation).

Figure 7:
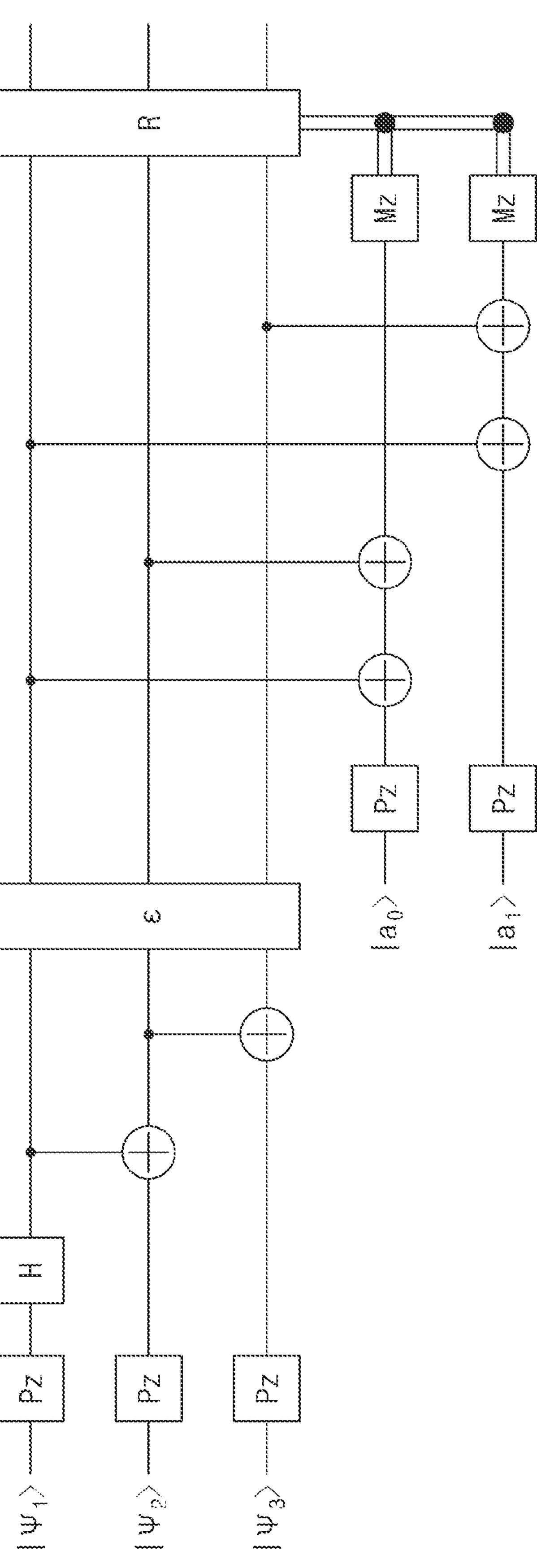
FIG. 7 shows an example of an algorithm circuit of a quantum algorithm.

FIG. 7 shows an example of an algorithm circuit of a quantum algorithm (or a quantum protocol). FIG. 7 shows an algorithm circuit of a 3-qubit quantum error correction circuit. Referring to FIG. 7 the 3-qubit quantum error correction circuit may prepare the first logical qubit $|\psi_1\rangle$, the second logical qubit $|\psi_2\rangle$, and the third logical qubit $|\psi_3\rangle$ as input logical qubits in preparation gates Pz (e.g., Z-axis preparation gates).

Afterward, the 3-qubit quantum error correction circuit may perform an operation of the Hadamard gate 'H' on the first data qubit $|\psi_1\rangle$. The 3-qubit quantum error correction circuit may perform the operation of the CNOT gate $\oplus$ with reference to the first data qubit $|\psi_1\rangle$ in the second data qubit $|\psi_2\rangle$. The 3-qubit quantum error correction circuit may perform the operation of the CNOT gate $\oplus$ with reference to the second data qubit $|\psi_2\rangle$ in the third data qubit $|\psi_3\rangle$. Afterward, the 3-qubit quantum error correction circuit may perform the operation of an error gate E capable of causing an error or inserting an error.

To correct a quantum error, the 3-qubit quantum error correction circuit may prepare the first ancilla qubit $|a_0\rangle$ and the second ancilla qubit $|a_1\rangle$ in the preparation gates Pz (e.g., the Z-axis preparation gates).

Afterward, the 3-qubit quantum error correction circuit may perform the operation of the CNOT gate $\oplus$ with reference to the first data qubit $|\psi_1\rangle$ in the first ancilla qubit $|a_0\rangle$. The 3-qubit quantum error correction circuit may perform the operation of the CNOT gate $\oplus$ with reference to the second data qubit $|\psi_2\rangle$ in the first ancilla qubit $|a_0\rangle$. The 3-qubit quantum error correction circuit may perform the operation of the CNOT gate $\oplus$ with reference to the first data qubit $|\psi_1\rangle$ in the second ancilla qubit $|a_1\rangle$. The 3-qubit quantum error correction circuit may perform the operation of the CNOT gate $\oplus$ with reference to the third data qubit $|\psi_3\rangle$ in the second ancilla qubit $|a_1\rangle$.

Afterward, the 3-qubit quantum error correction circuit may perform an operation of a measurement gate Mz (e.g., a Z-axis measurement gate) in the first ancilla qubit $|a_0\rangle$. The 3-qubit quantum error correction circuit may perform the operation of the measurement gate Mz (e.g., the Z-axis measurement gate) in the second ancilla qubit $|a_1\rangle$. As displayed by using two lines, the operation results of the measurement gates Mz may be stored in a semiconductor memory. The 3-qubit quantum error correction circuit may perform an operation of a restoration gate R with reference to the measurement results stored in the semiconductor memory in the first data qubit $|\psi_1\rangle$, the second data qubit $|\psi_2\rangle$, and the third data qubit $|\psi_3\rangle$.

FIG. 8 shows an example of an intermediate circuit DAG 300 generated from the algorithm circuit of FIG. 7. Referring to FIGS. 7 and 8, the intermediate circuit DAG 300 may indicate only gates of an algorithm circuit.

A block 311 (PrepZ $|\psi_1\rangle$) may correspond to the preparation gate Pz for preparing (PrepZ) the first data qubit $|\psi_1\rangle$. A block 312 (PrepZ $|\psi_2\rangle$) may correspond to the preparation gate Pz for preparing (PrepZ) the second data qubit $|\psi_2\rangle$. A block 313 (PrepZ $|\psi_3\rangle$) may correspond to the preparation gate Pz for preparing (PrepZ) the third data qubit $|\psi_3\rangle$. A block 314 (PrepZ $|a_0\rangle$) may correspond to the preparation gate Pz for preparing (PrepZ) the first ancilla qubit $|a_0\rangle$. A block 315 (PrepZ $|a_1\rangle$) may correspond to the preparation gate Pz for preparing (PrepZ) the second ancilla qubit $|a_1\rangle$.

A block 321 (H $|\psi_1\rangle$) may correspond to the Hadamard gate 'H' for the first data qubit $|\psi_1\rangle$. A block 331 (CNOT $|\psi_1\rangle$, $|\psi_2\rangle$) may correspond to the CNOT gate $\oplus$ performed with reference to the first data qubit $|\psi_1\rangle$ in the second data qubit $|\psi_2\rangle$. A block 341 (CNOT $|\psi_2\rangle$, $|\psi_3\rangle$) may correspond to the CNOT gate $\oplus$ performed with reference to the second data qubit $|\psi_2\rangle$ in the third data qubit $|\psi_3\rangle$. A block 342 (CNOT $|\psi_1\rangle$, $|a_0\rangle$) may correspond to the CNOT $\oplus$ gate K performed with reference to the first data qubit $|\psi_1\rangle$ in the first ancilla qubit $|a_0\rangle$.

A block 351 (CNOT $|\psi_1\rangle$, $|a_0\rangle$) may correspond to the CNOT gate $\oplus$ performed with reference to the second data qubit $|\psi_2\rangle$ in the first ancilla qubit $|a_0\rangle$. A block 352 (CNOT $|\psi_1\rangle$, $|a_1\rangle$) may correspond to the CNOT gate $\oplus$ performed with reference to the first data qubit $|\psi_1\rangle$ in the second ancilla qubit $|a_1\rangle$.

A block 361 (MeaZ $|\psi_4\rangle$) may correspond to the measurement gate Mz performed in the first ancilla qubit $|a_0\rangle$. A block 362 (CNOT $|\psi_3\rangle$, $|a_1\rangle$) may correspond to the CNOT gate $\oplus$ performed with reference to the third data qubit $|\psi_3\rangle$ in the second ancilla qubit $|a_1\rangle$. A block 371 (MeaZ $|a_1\rangle$) may correspond to the measurement gate Mz performed in the second ancilla qubit $|a_1\rangle$.

FIG. 9 shows an example of a circuit DAG 400 generated from the intermediate circuit DAG 300 of FIG. 8. Referring to FIGS. 8 and 9, the block 311, the block 312, the block 313, the block 314, the block 315, the block 321, the block 331, the block 341, the block 342, the block 351, the block 352, the block 361, the block 362, and the block 371 may be the same as the blocks in the intermediate circuit DAG. Accordingly, additional description will be omitted to avoid redundancy.

As compared to the intermediate circuit DAG 300, the circuit DAG 400 may further include a block 363, a block 364, and a block 372. The block 363 (Move $|\psi_2\rangle$) may be a quantum operation of moving the second data qubit $|\psi_2\rangle$ to an initial qubit location. The block 364 (Move $|\psi_1\rangle$) may be a quantum operation of moving the first data qubit $|\psi_1\rangle$ to the initial qubit location. The block 372 (Move $|\psi_3\rangle$) may be a quantum operation of moving the third data qubit $|\psi_3\rangle$ to the initial qubit location.

Figure 10:
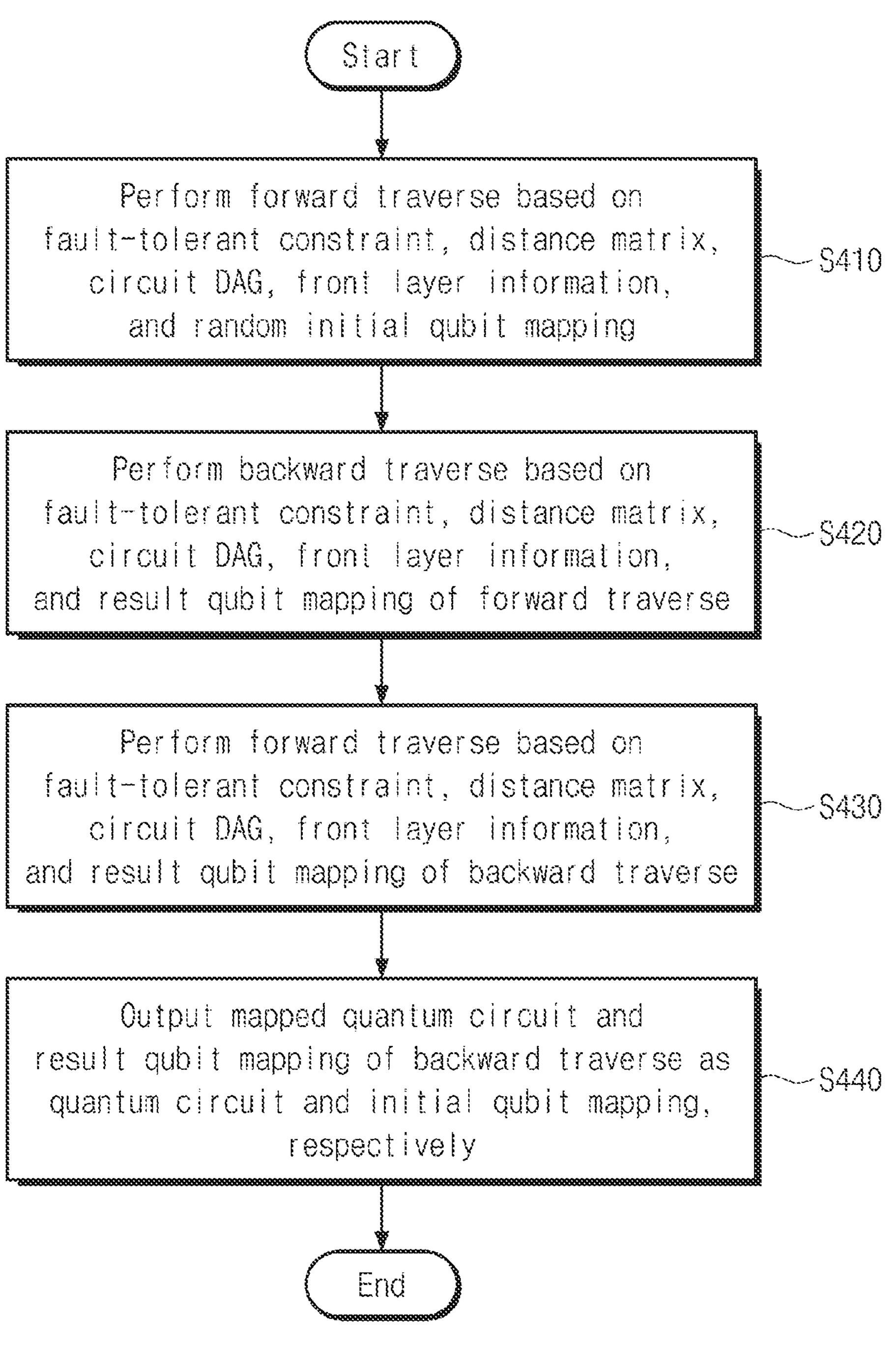
FIG. 10 shows that a computing device performs a quantum circuit mapping based on a fault-tolerant constraint and quantum mapping basis information.

FIG. 10 shows that the computing device 100 performs a quantum circuit mapping based on a fault-tolerant constraint and quantum mapping basis information (in operation S130 of FIG. 4). Referring to FIGS. 1 and 10, in operation S410, the circuit mapping unit 120 of the computing device 100 may perform a first forward traverse based on a fault-tolerant constraint, a distance matrix of quantum mapping basis information, a circuit DAG of the quantum mapping basis information, front layer information of the quantum mapping basis information, and a random initial qubit mapping.

The distance matrix of the quantum mapping basis information may include structure information of the quantum chip 210. The circuit DAG 400 (see FIG. 9) of the quantum mapping basis information may include structure information of a quantum algorithm. The front layer information of the quantum mapping basis information may identify quantum operations to be performed currently in the circuit DAG.

The front layer may indicate quantum operations capable of being currently performed at the same time, in parallel and independently of each other in the circuit DAG. In the circuit DAG 400 of FIG. 9, the first front layer may include the block 311, the block 312, the block 313, the block 314, and the block 315. When the forward traverse for each of the block 311, the block 312, the block 313, the block 314, and the block 315 is completed, the front layer may be changed to the block 321. That is, the front layer information may identify a quantum operation, which will be performed on a current forward traverse in the circuit DAG.

In operation S420, the circuit mapping unit 120 of the computing device 100 may perform a backward traverse based on the fault-tolerant constraint, the distance matrix of the quantum mapping basis information, the circuit DAG of the quantum mapping basis information, the front layer information of the quantum mapping basis information, and the result qubit mapping of the first forward traverse.

In the circuit DAG 400 of FIG. 9, the first front layer may be the block 371, the block 372, the block 361, and the block 363. When the backward traverse for each of the block 371, the block 372, the block 361, and the block 363 is completed, the block 351 and the block 362 may be identified as new front layers.

In operation S430, the circuit mapping unit 120 of the computing device 100 may perform a second forward traverse based on the fault-tolerant constraint, the distance matrix of the quantum mapping basis information, the circuit DAG of the quantum mapping basis information, the front layer information of the quantum mapping basis information, and the result qubit mapping of the backward traverse.

Details associated with the first forward traverse, the backward traverse, and the second forward traverse are described in "Tackling the Qubit Mapping Problem for NISQ-Era Quantum Devices" published on Apr. 13, 2019 by 'Li, G., Ding, Y., and Xie, Y.', and are included as a reference.

In operation S440, the circuit mapping unit 120 of the computing device 100 may output a quantum circuit generated in the second forward traverse and the result qubit mapping of the backward traverse as the quantum circuit QC and the initial qubit mapping IM, respectively.

Figure 11:
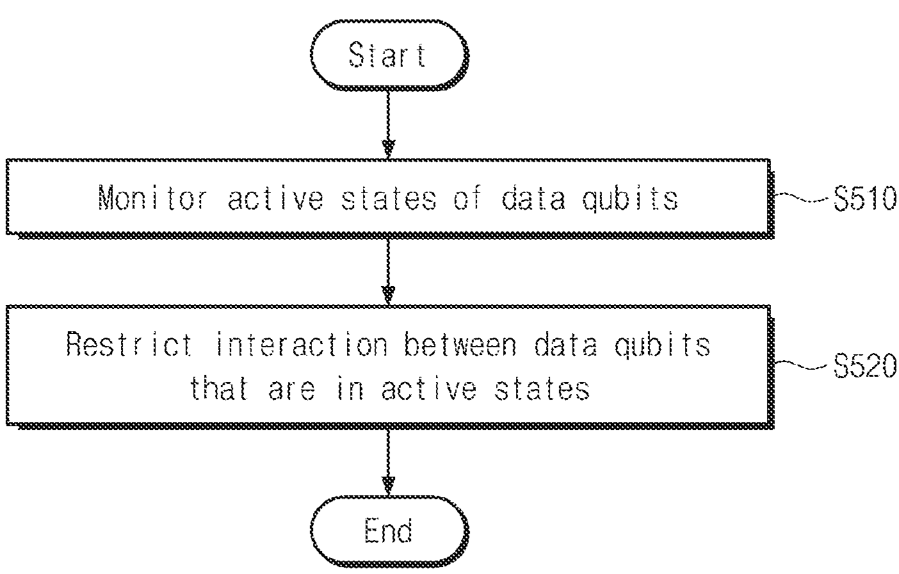
FIG. 11 shows that a computing device applies a fault-tolerant constraint during a first forward traverse, a backward traverse, and a second forward traverse.

FIG. 11 shows that the computing device 100 applies a fault-tolerant constraint during a first forward traverse, a backward traverse, and a second forward traverse. Referring to FIGS. 1 and 11, in operation S510, the circuit mapping unit 120 of the electronic device 100 may monitor active states of data qubits.

For example, physical qubits in a logical qubit may include data qubits, which store data, and non-data qubits that do not store data. Input data qubits may be mapped onto some of the physical qubits of the logical qubit by performing quantum error correction encoding. Moreover, among the other physical qubits, error syndrome qubits in a syndrome measurement operation, auxiliary qubits in a quantum operation, or physical qubits for storing (e.g., temporarily storing) checkup qubits may be included in the data qubits.

In operation S520, the circuit mapping unit 120 of the electronic device 100 may restrict an interaction between the data qubits that are in active states. To prevent a quantum error from being propagated within the logical qubit, the fault-tolerant constraint may include restricting a 2-qubit quantum operation (e.g., an interaction) between the data qubits, which are in active states and which store data, from among physical qubits belonging to the same logical qubit.

For example, when the [[n, k, d]] quantum error correction code is used, the 2-qubit quantum operation (e.g., the interaction) between the data qubits within the same logical qubit may be allowed up to "(d−1)/4" times. The 2-qubit quantum operation (e.g., the interaction), which is performed between the data qubits within the same logical qubit as much as the number of times exceeding '(d−1)/4' times, may be prohibited.

Figure 12:
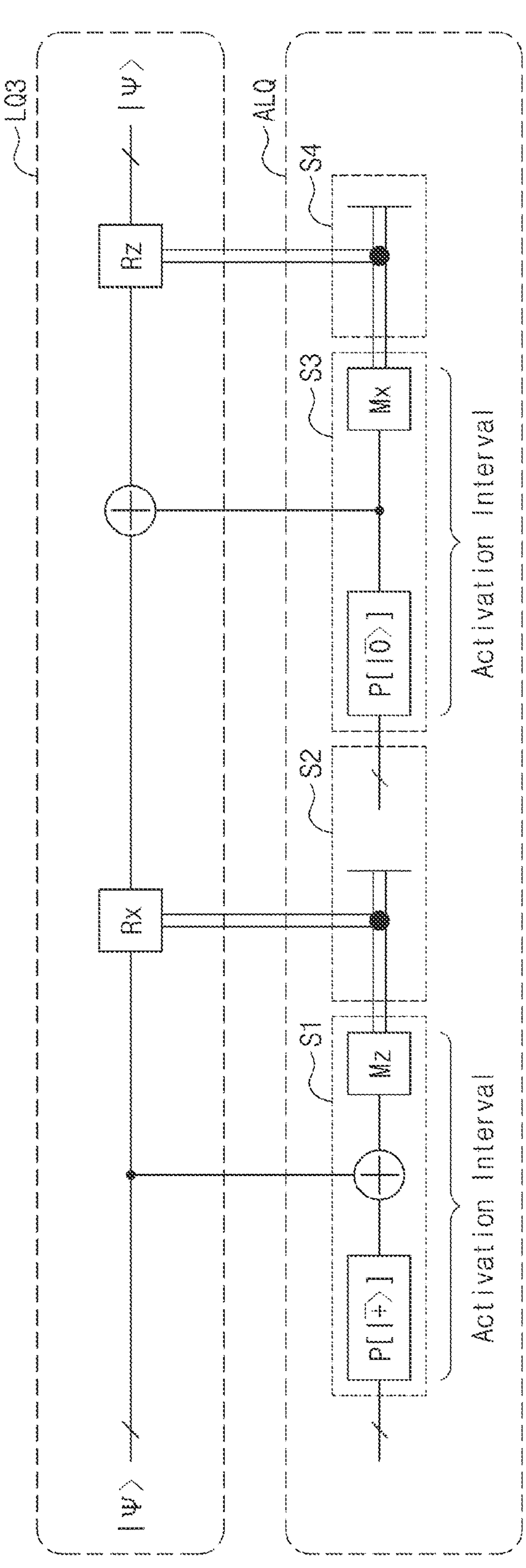
FIG. 12 shows that data qubit is activated and deactivated.

FIG. 12 shows that data qubit is activated and deactivated. FIG. 12 shows that a logical qubit LQ3 $|\psi_3\rangle$ interacts with an auxiliary logical qubit ALQ. An algorithm circuit of FIG. 12 may measure ALQ and correct an error of the logical qubit LQ3 based on the measurement outcome.

Referring to FIG. 12, in a first segment S1 which is an activation interval, the auxiliary logical qubit ALQ may be prepared by a preparation gate $P[|\mp\rangle]$. For example, the preparation gate $P[|\mp\rangle]$ may prepare a value of 'logical +'. An operation of the CNOT gate $\oplus$ may be performed with reference to the logical qubit LQ3 in the auxiliary logical qubit ALQ. Afterward, Z-axis measurement may be performed in the measurement gate Mz. In the first segment S1, the auxiliary logical qubit ALQ may be in an active state.

In a second segment S2, X-axis restoration may be performed by the restoration gate Rx with reference to a measurement result of the auxiliary logical qubit ALQ in the logical qubit LQ3. In the second segment S2, the auxiliary logical qubit ALQ may be in an inactive state.

In a third segment S3 which is an activation interval, the auxiliary logical qubit ALQ may be prepared by a preparation gate $P[|\bar{0}\rangle]$. For example, the preparation gate $P[|\bar{0}\rangle]$ may prepare a value of 'logical 0'. The operation of the CNOT gate $\oplus$ may be performed with reference to the auxiliary logical qubit ALQ in the logical qubit LQ3. Afterward, X-axis measurement may be performed in a measurement gate Mx. In the third segment S3, the auxiliary logical qubit ALQ may be in an active state.

In a fourth segment S4, Z-axis restoration may be performed by a restoration gate Rz with reference to the measurement result of the auxiliary logical qubit ALQ in the logical qubit LQ3. In the fourth segment S4, the auxiliary logical qubit ALQ may be in an inactive state.

As shown in the auxiliary logical qubit ALQ of FIG. 12, the physical data qubits of a logical qubit may be activated between a preparation gate and a measurement gate in a forward direction and may be activated between the measurement gate and the preparation gate in a reverse direction.

Figure 13:
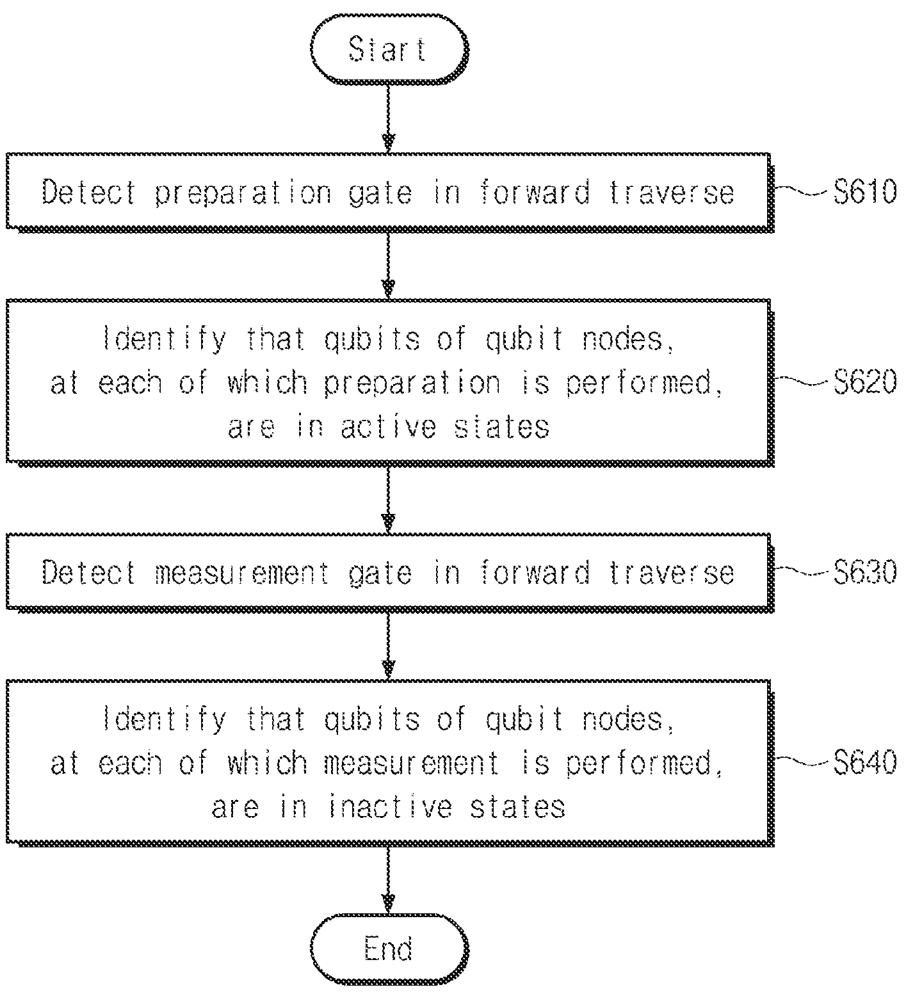
FIG. 13 shows an example of identifying activation and deactivation of data qubits while a computing device performs a forward traverse.

FIG. 13 shows an example of identifying activation and deactivation of data qubits while the computing device 100 performs a forward traverse. Referring to FIGS. 1 and 13, in operation S610, the circuit mapping unit 120 of the computing device 100 may detect a preparation gate in a forward traverse (e.g., a first forward traverse or a second forward traverse). In operation S620, the circuit mapping unit 120 of the computing device 100 may identify that qubits of qubit nodes, at each of which preparation is performed, are in active states.

In operation S630, the circuit mapping unit 120 of the computing device 100 may detect a measurement gate in the forward traverse (e.g., the first forward traverse or the second forward traverse). In operation S640, the circuit mapping unit 120 of the computing device 100 may identify that qubits of qubit nodes, at each of which measurement is performed, are in inactive states.

Figure 14:
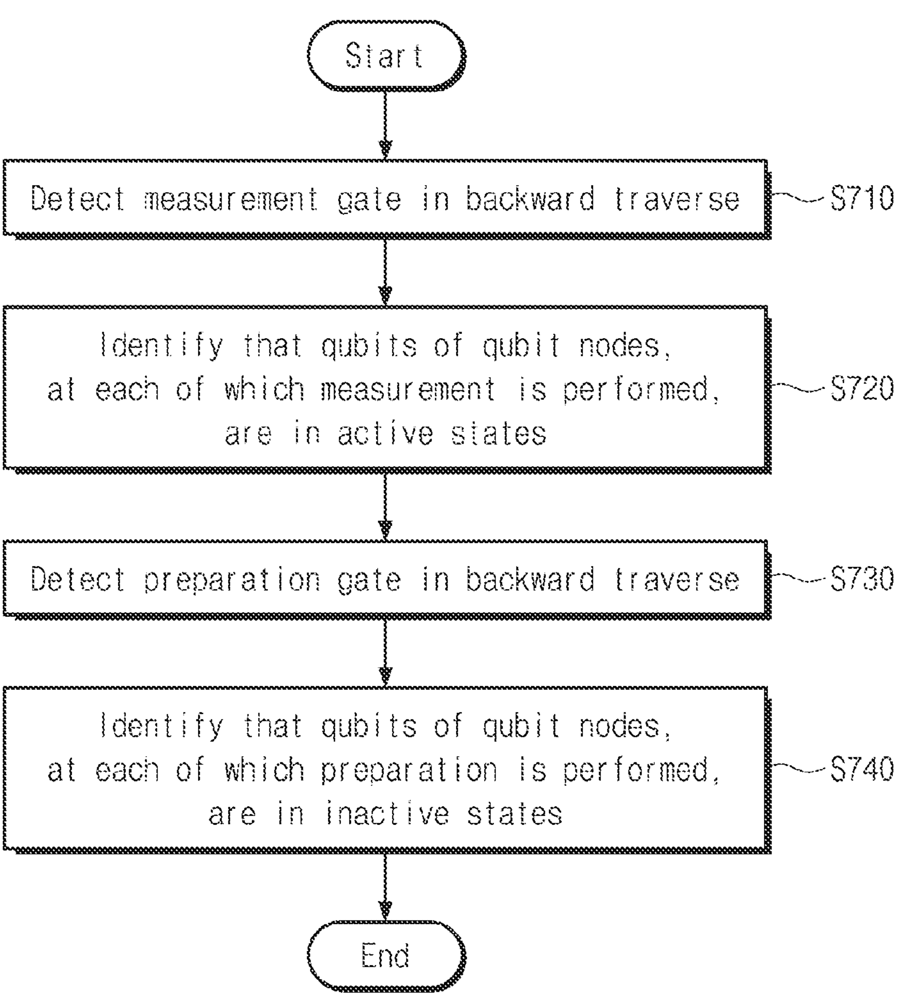
FIG. 14 shows an example of identifying activation and deactivation of data qubits while a computing device performs a backward traverse.

FIG. 14 shows an example of identifying activation and deactivation of data qubits while the computing device 100 performs a backward traverse. Referring to FIGS. 1 and 14, in operation S710, the circuit mapping unit 120 of the computing device 100 may detect a measurement gate in a backward traverse. In operation S720, the circuit mapping unit 120 of the computing device 100 may identify that qubits of qubit nodes, at each of which measurement is performed, are in active states.

In operation S730, the circuit mapping unit 120 of the computing device 100 may detect a preparation gate in the backward traverse. In operation S740, the circuit mapping unit 120 of the computing device 100 may identify that qubits of qubit nodes, at each of which preparation is performed, are in inactive states.

Figure 15:
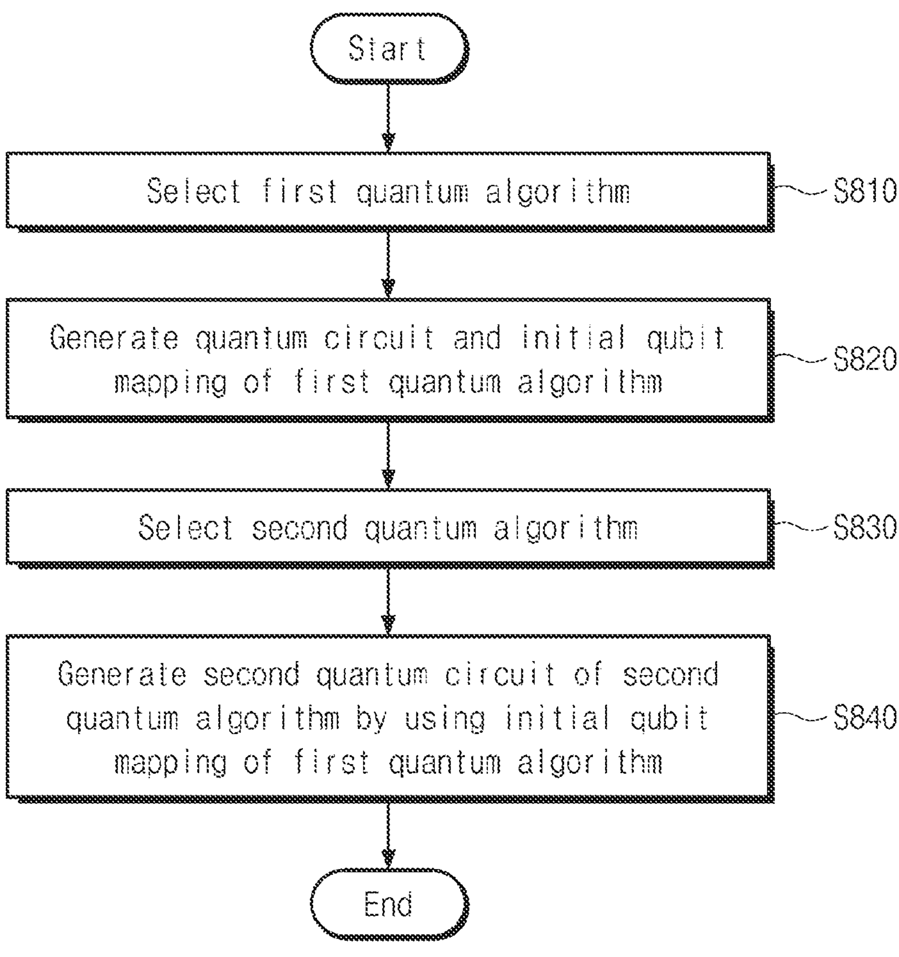
FIG. 15 shows that a computing device connects and maps two or more quantum circuits.

FIG. 15 shows that the computing device 100 connects and maps two or more quantum circuits. Referring to FIGS. 1 and 15, in operation S810, the circuit mapping unit 120 of the computing device 100 may select a first quantum algorithm. The first quantum algorithm may be a reference quantum algorithm (or a pivot quantum algorithm) for mapping quantum circuits. The first quantum algorithm may be a quantum algorithm, which is most frequently used, and may include, for example, a syndrome measurement algorithm or a quantum error correction algorithm.

In operation S820, the circuit mapping unit 120 of the computing device 100 may generate a quantum circuit and an initial qubit mapping of the first quantum algorithm. According to the method described with reference to FIGS. 1 to 14, the circuit mapping unit 120 of the computing device 100 may generate the quantum circuit and the initial qubit mapping.

In operation S830, the circuit mapping unit 120 of the computing device 100 may select a second quantum algorithm that will perform a quantum circuit mapping. In operation S840, the circuit mapping unit 120 of the computing device 100 may generate the second quantum circuit of the second quantum algorithm by using the initial qubit mapping of the first quantum algorithm. For example, the circuit mapping unit 120 of the computing device 100 may map the second quantum circuit of the second quantum algorithm from the initial qubit mapping of the first quantum algorithm by performing a forward traverse once.

Figure 16:
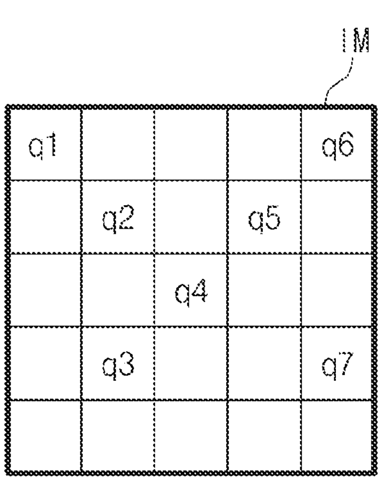
FIG. 16 shows an example of an initial qubit mapping of a reference quantum algorithm.

FIG. 16 shows an example of the initial qubit mapping IM of a reference quantum algorithm (or a pivot quantum algorithm). Referring to FIG. 16, 25 cells may correspond to physical qubits (or qubit nodes) of the quantum chip 210, respectively. The initial qubit mapping IM may map first to seventh input data qubits q1 to q7 onto the 25 physical qubits (or qubit nodes).

Moreover, the other quantum algorithms (e.g., quantum algorithms performed in a single logical qubit) other than a reference quantum algorithm (or a pivot quantum algorithm) may be mapped based on the initial qubit mapping IM. Accordingly, quantum algorithms (e.g., quantum algorithms performed on a single logical qubit) may share the initial qubit mapping IM with one another.

Figure 17:
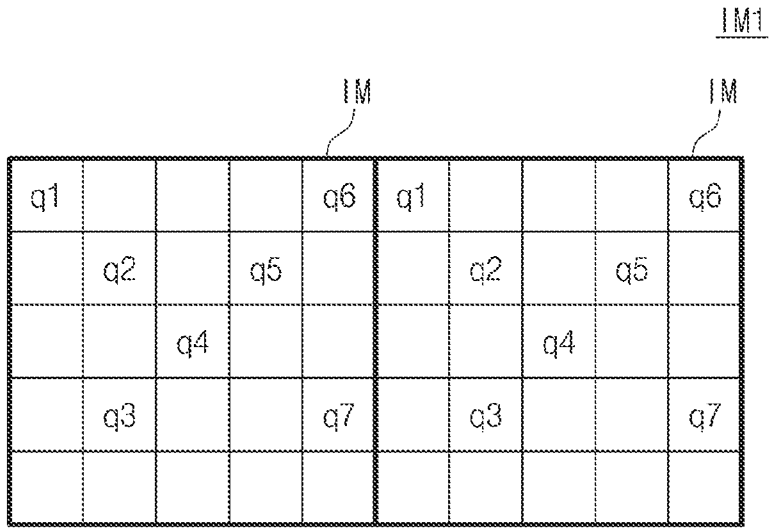
FIG. 17 shows an example of applying an initial qubit mapping of a reference quantum algorithm to a 2-qubit quantum algorithm.

FIG. 17 shows an example of applying the initial qubit mapping IM of a reference quantum algorithm (or a pivot quantum algorithm) to a 2-qubit quantum algorithm. Referring to FIG. 17, the circuit mapping unit 120 of the electronic device 100 may form a 2-qubit initial mapping IM1 by horizontally combining the two initial qubit mappings IM. The circuit mapping unit 120 of the electronic device 100 may map the 2-qubit quantum algorithm by using the 2-qubit initial mapping IM1.

Figure 18:
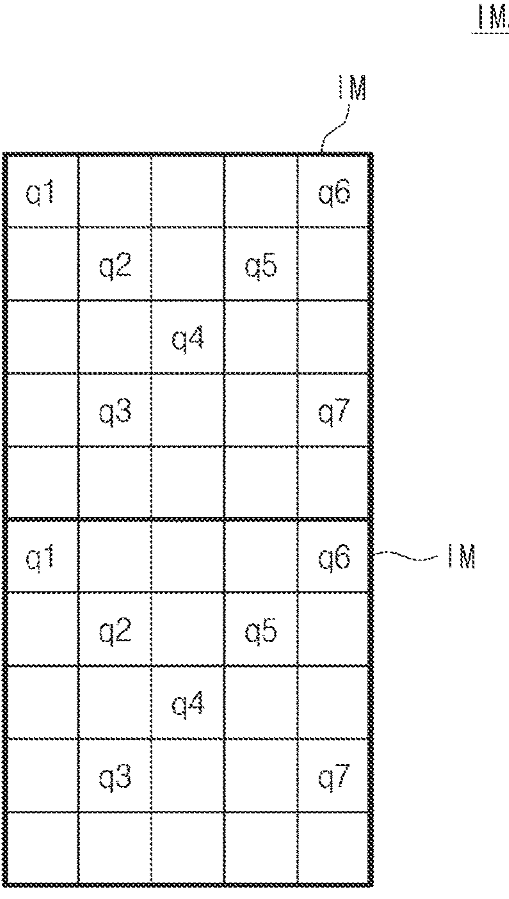
FIG. 18 shows another example of applying an initial qubit mapping of a reference quantum algorithm to a 2-qubit quantum algorithm.

FIG. 18 shows another example of applying the initial qubit mapping IM of a reference quantum algorithm (or a pivot quantum algorithm) to a 2-qubit quantum algorithm. Referring to FIG. 18, the circuit mapping unit 120 of the electronic device 100 may form a 2-qubit initial mapping IM2 by vertically combining the two initial qubit mappings IM. The circuit mapping unit 120 of the electronic device 100 may map the 2-qubit quantum algorithm by using the 2-qubit initial mapping IM2.

As described with reference to FIGS. 17 and 18, the circuit mapping unit 120 of the electronic device 100 may arrange the initial qubit mapping IM corresponding to one logical qubit in the left, right, down, or up direction of the initial qubit mapping IM corresponding to another logical qubit and then may perform a quantum circuit mapping. The circuit mapping unit 120 of the electronic device 100 may output one quantum circuit (e.g., a quantum circuit having the highest performance) among collected quantum circuits and a corresponding 2-qubit initial mapping.

Moreover, the quantum circuit mapping of an n-qubit quantum algorithm (here, 'n' is not less than 3) may be performed in the same manner as described with reference to FIGS. 17 and 18. For example, when mapping an m-qubit quantum algorithm ('m' is a positive integer), the circuit mapping unit 120 of the electronic device 100 may change arrangements of 'm' initial qubit mappings and then may perform a quantum circuit mapping. The circuit mapping unit 120 of the electronic device 100 may output one quantum circuit (e.g., a quantum circuit having the highest performance) among collected quantum circuits and a corresponding 2-qubit initial mapping.

Figure 19:
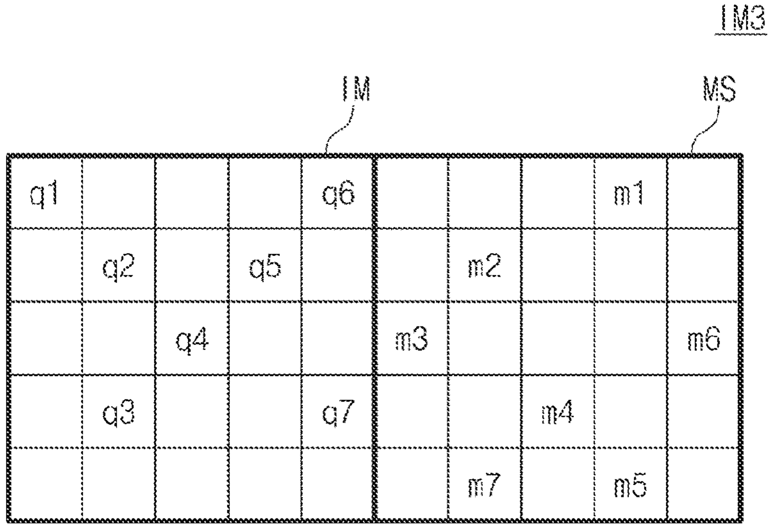
FIG. 19 shows an example of an initial qubit mapping for a quantum circuit mapping of a T-gate.

FIG. 19 shows an example of an initial qubit mapping IM3 for a quantum circuit mapping of a T-gate. Referring to FIG. 19, the initial qubit mapping IM3 of a T-gate may include the initial qubit mapping IM and a magic state qubit mapping MS. The magic state qubit mapping MS may be generated by a magic state generator (not shown) of the circuit mapping unit 120.

The circuit mapping unit 120 of the electronic device 100 may arrange the initial qubit mapping IM (or the magic state qubit mapping MS) in the left, right, down, or up direction of the magic state qubit mapping MS (or the initial qubit mapping IM) and then may perform a quantum circuit mapping. The circuit mapping unit 120 of the electronic device 100 may output one quantum circuit (e.g., a quantum circuit having the highest performance) among collected quantum circuits and a corresponding 2-qubit initial mapping.

Figure 20:
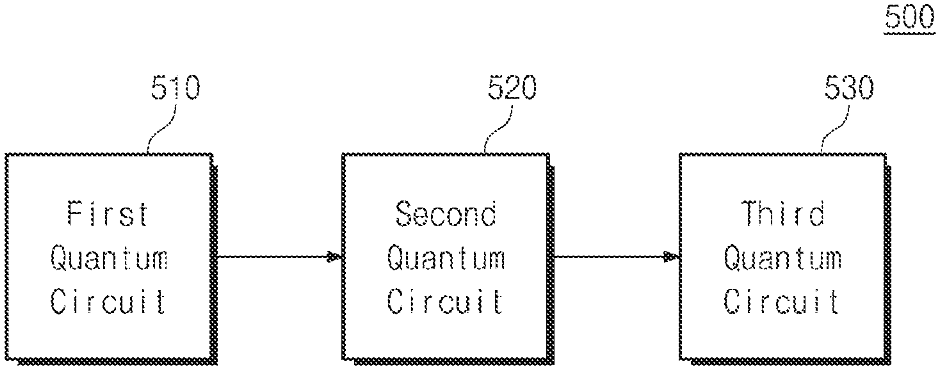
FIG. 20 shows an example of an integrated quantum circuit in which quantum circuits generated by a computing device are combined.

FIG. 20 shows an example of an integrated quantum circuit 500 in which quantum circuits generated by the computing device 100 are combined.

Referring to FIG. 20, the integrated quantum circuit 500 may include a first quantum circuit 510, a second quantum circuit 520, and a third quantum circuit 530. Each of the first quantum circuit 510, the second quantum circuit 520, and the third quantum circuit 530 may be generated by the electronic circuit 100 based on the initial qubit mapping IM of a reference quantum algorithm (or a pivot quantum algorithm).

Each of the first quantum circuit 510, the second quantum circuit 520, and the third quantum circuit 530 may include one or more quantum operations. The first quantum circuit 510 may receive input data qubit(s) corresponding to the initial qubit mapping IM, and may output data qubit(s) corresponding to the initial qubit mapping IM (as described with reference to FIGS. 6, 7, 8, and 9).

The second quantum circuit 520 may receive data qubit(s) corresponding to the initial qubit mapping IM from the first quantum circuit 510 as input data qubit(s). The first quantum circuit 510 may be a j-qubit quantum circuit ('j' is a positive integer), and the second quantum circuit 520 may be an i-qubit quantum circuit ('i' is a positive integer).

When 'j' is greater than 'i', 'i' logical qubits among 'j' logical qubits of the first quantum circuit 510 may be delivered to the second quantum circuit 520 as input data qubits. Operations of 'j-i' logical qubits may be terminated by measurement in the first quantum circuit 510.

When 'j' is less than 'i', 'j' logical qubits of the first quantum circuit 510 may be delivered to the second quantum circuit 520. In the second quantum circuit 520, 'i-j' logical qubits may be generated by preparation.

When 'j' is the same as 'i', 'j' logical qubits of the first quantum circuit 510 may be delivered to the second quantum circuit 520.

Each of logical qubits output from the first quantum circuit 510 has an arrangement corresponding to the initial qubit mapping IM. The second quantum circuit 520 has been mapped under the assumption that each of logical qubits has an arrangement corresponding to the initial qubit mapping IM. Accordingly, logical qubits may be delivered without a separate additional operation between the first quantum circuit 510 and the second quantum circuit 520.

Besides, the delivery of logical qubits may be made between the second quantum circuit 520 and the third quantum circuit 530 in the same manner as the delivery of logical qubits between the first quantum circuit 510 and the second quantum circuit 520. Besides, even when a quantum circuit is added to the front end of the first quantum circuit 510 or a quantum circuit is added to the rear end of the third quantum circuit 530, the delivery of logical qubits may be made without a separate additional operation in the same manner as the delivery of logical qubits between the first quantum circuit 510 and the second quantum circuit 520. Accordingly, the scalability and versatility of the integrated quantum circuit 500 may be increased.

In the above embodiments, components according to the present disclosure are described by using the terms "first", "second", "third", etc. However, the terms "first", "second", "third", etc. may be used to distinguish components from each other and do not limit the present disclosure. For example, the terms "first", "second", "third", etc. do not involve an order or a numerical meaning of any form.

In the above embodiments, components according to embodiments of the present disclosure are referenced by using blocks. The blocks may be implemented with various hardware devices, such as an integrated circuit, an application specific IC (ASIC), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit, or circuits enrolled as an intellectual property (IP).

The above description refers to detailed embodiments for carrying out the present disclosure. Embodiments in which a design is changed simply or which are easily changed may be included in the present disclosure as well as an embodiment described above. In addition, technologies that are easily changed and implemented by using the above embodiments may be included in the present disclosure. While the present disclosure has been described with reference to embodiments thereof, it will be apparent to those of ordinary skill in the art that various changes and modifications may be made thereto without departing from the spirit and scope of the present disclosure as set forth in the following claims.

According to embodiments of the present disclosure, a computing device is configured to map a quantum circuit based on a fault-tolerant constraint. Accordingly, the computing device that automatically maps a fault-tolerant quantum circuit and an operating method of the computing device are provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An operating method of a computing device, the method comprising:

generating, by the computing device, quantum mapping basis information based on a fault-tolerant constraint, wherein the fault-tolerant constraint includes restricting a 2-qubit quantum operation from among physical qubits carrying quantum information and belonging to a same logical qubit;

generating, by the computing device, quantum circuits and initial qubit mappings by performing a quantum circuit mapping a predetermined maximum number of times based on the fault-tolerant constraint, the quantum mapping basis information, and different random initial qubit mappings; and selecting, by the computing device, one quantum circuit and one initial qubit mapping from among the quantum circuits and the initial qubit mappings, respectively.

2. The method of claim 1, wherein the generating of the quantum mapping basis information based on the fault-tolerant constraint includes:

obtaining a coupling graph of physical qubits of a quantum chip;

generating a distance matrix from the coupling graph of the physical qubits;

obtaining a quantum assembly (QASM) code;

generating a circuit directed acyclic graph (DAG) based on the QASM and the fault-tolerant constraint; and detecting a front layer of the circuit DAG.

3. The method of claim 2, wherein the generating of the circuit DAG based on the QASM and the fault-tolerant constraint includes:

generating an intermediate circuit DAG based on the QASM; and generating the circuit DAG by adding a quantum operations, which move input data qubits to initial locations, to the intermediate circuit DAG.

4. The method of claim 2, wherein the quantum mapping basis information includes the distance matrix, the circuit DAG, and information of the front layer.

5. The method of claim 1, wherein the performing of the quantum circuit mapping includes:

performing a first forward traverse based on the fault-tolerant constraint, the quantum mapping basis information, and one random initial qubit mapping among the random initial qubit mappings;

performing a backward traverse based on the fault-tolerant constraint, the quantum mapping basis information, and a result qubit mapping of the first forward traverse;

performing a second forward traverse based on the fault-tolerant constraint, the quantum mapping basis information, and a result qubit mapping of the backward traverse; and outputting a quantum circuit mapped in the second forward traverse and the result qubit mapping of the backward traverse as a quantum circuit and an initial qubit mapping, which correspond to the one random initial qubit mapping.

6. The method of claim 5, wherein the fault-tolerant constraint includes restricting an interaction between data qubits, which are in active states within one logical qubit, during the first forward traverse, the backward traverse, and the second forward traverse.

7. The method of claim 6, wherein each of the first forward traverse and the second forward traverse changes a use state of a data qubit into an active state in response to a preparation of the data qubit and changes the use state of the data qubit into an inactive state in response to a measurement of the data qubit.

8. The method of claim 6, wherein the backward traverse changes a use state of a data qubit into an active state in response to a measurement of the data qubit and changes the use state of the data qubit into an inactive state in response to a preparation of the data qubit.

9. The method of claim 1, further comprising:

generating second quantum mapping basis information based on the fault-tolerant constraint; and generating a second quantum circuit by performing the quantum circuit mapping based on the fault-tolerant constraint, the second quantum mapping basis information, and the one initial qubit mapping.

10. A computing device comprising:

a constraint storage device configured to store a fault-tolerant constraint, wherein the fault-tolerant constraint includes restricting a 2-qubit quantum operation from among physical qubits carrying quantum information and belonging to a same logical qubit; and a circuit mapping device configured to generate a quantum circuit and an initial qubit mapping by performing a quantum circuit mapping based on information of a quantum chip including physical qubits, quantum algorithm information, and the fault-tolerant constraint, wherein the circuit mapping unit is configured to:

perform the quantum circuit mapping a predetermined maximum number of times based on different random initial qubit mappings; and select the quantum circuit and the initial qubit mapping among quantum circuits and initial qubit mappings, which correspond to the different random initial qubit mappings.

11. The computing device of claim 10, wherein the circuit mapping unit is configured to:

generate a distance matrix of the physical qubits from the information of the quantum chip;

generate a circuit DAG based on the fault-tolerant constraint from the quantum algorithm information; and detect a front layer from the circuit DAG.

12. The computing device of claim 11, wherein the circuit mapping unit is configured to:

generate an intermediate circuit DAG from the quantum algorithm information; and generate the circuit DAG by adding quantum operations, which move input data qubits to initial locations, to the intermediate circuit DAG.

13. The computing device of claim 11, wherein the circuit mapping unit is configured to:

perform the quantum circuit mapping as much as the predetermined maximum number of times based on the distance matrix, the circuit DAG, information of the front layer, the fault-tolerant constraint, and the different random initial qubit mappings.

14. The computing device of claim 10, wherein the circuit mapping unit is configured to:

perform a first forward traverse based on the information of the quantum chip, the quantum algorithm information, the fault-tolerant constraint, and one random initial qubit mapping among the random initial qubit mappings;

perform a backward traverse based on the information of the quantum chip, the quantum algorithm information, the fault-tolerant constraint, and a result qubit mapping of the first forward traverse; and perform the quantum circuit mapping by performing a second forward traverse based on the information of the quantum chip, the quantum algorithm information, the fault-tolerant constraint, and a result qubit mapping of the backward traverse, and wherein the circuit mapping unit outputs a quantum circuit mapped in the second forward traverse and the result qubit mapping of the backward traverse, as the quantum circuit and the initial qubit mapping.

15. The computing device of claim 14, wherein the fault-tolerant constraint includes restricting an interaction between data qubits, which are in active states within one logical qubit, during the first forward traverse, the backward traverse, and the second forward traverse.

16. The computing device of claim 15, wherein, in each of the first forward traverse and the second forward traverse, the circuit mapping unit changes a use state of a data qubit into an active state in response to a preparation of the data qubit and changes the use state of the data qubit into an inactive state in response to a measurement of the data qubit.

17. The computing device of claim 15, wherein, in the backward traverse, the circuit mapping unit changes a use state of a data qubit into an active state in response to a measurement of the data qubit and changes the use state of the data qubit into an inactive state in response to a preparation of the data qubit.

18. The computing device of claim 10, wherein the circuit mapping unit is further configured to:

generate a second quantum circuit by performing the quantum circuit mapping based on the information of the quantum chip, second quantum algorithm information, the fault-tolerant constraint, and the initial qubit mapping.

* * * * *